US012693384B2

(12) United States Patent　　　　(10) Patent No.:　US 12,693,384 B2
Sanders, III et al.　　　　　　　　　　(45) Date of Patent:　　　Jul. 28, 2026

(54) CHANNEL FUSION USING MULTIPLE MEASUREMENTS

(71) Applicant: Luminar Technologies, Inc., Orlando, FL (US)

(72) Inventors: James Chester Sanders, III, Atlanta, GA (US); Istvan Peter Burbank, Orlando, FL (US); Christopher Gary Sentelle, Orlando, FL (US)

(73) Assignee: Microvision, Inc., Redmond, WA (US)

( * ) Notice: Subject to any disclaimer, the term of this patent is extended or adjusted under 35 U.S.C. 154(b) by 625 days.

(21) Appl. No.: 18/198,729

(22) Filed: May 17, 2023

(65) Prior Publication Data

US 2024/0385292 A1　　　Nov. 21, 2024

(51) Int. Cl.
　　*G01S 7/48*　　　　　(2006.01)
　　*G01S 7/481*　　　　(2006.01)
　　*G01S 17/10*　　　　(2020.01)
(52) U.S. Cl.
　　CPC .......... *G01S 7/4802* (2013.01); *G01S 7/4808* (2013.01); *G01S 7/4816* (2013.01); *G01S 7/4817* (2013.01); *G01S 17/10* (2013.01)

(58) Field of Classification Search
　　CPC .... G01S 7/4802; G01S 7/4808; G01S 7/4816; G01S 7/4817; G01S 17/10
　　See application file for complete search history.

(56) References Cited

U.S. PATENT DOCUMENTS

| | | | |
|---|---|---|---|
| 2017/0131388 A1* | 5/2017 | Campbell | G01S 7/4816 |
| 2018/0284240 A1* | 10/2018 | LaChapelle | G01S 17/10 |
| 2020/0182968 A1* | 6/2020 | Gaalema | G01S 7/4817 |
| 2022/0020170 A1* | 1/2022 | Gorodetsky | G06T 7/13 |
| 2022/0291387 A1* | 9/2022 | Pacala | G01S 7/4815 |
| 2024/0241223 A1* | 7/2024 | Stanley-Marbell | G01S 17/89 |

* cited by examiner

*Primary Examiner* — Jonathan Malikasim
(74) *Attorney, Agent, or Firm* — Kevin D. Wills

(57) ABSTRACT

A system comprises a light source, a receiver, and a processor. The light source is configured to generate an emitted pulse of light. The receiver is configured to detect at least a portion of the emitted pulse of light scattered by an external target and provide a plurality of different measurement signals for the detected emitted pulse of light. The processor is configured to analyze the plurality of different measurement signals to identify the plurality of different measurement signals as corresponding to the same external target and combine the identified plurality of different measurement signals to determine a measurement for the external target.

20 Claims, 14 Drawing Sheets

1101 Determine Measurement Signals From Scattered Light

1103 Group Related Measurement Signals

1105 Fuse Grouped Signals

1107 Provide Sensor Readings

Start

1201 ⟿ Receive Measurement Signals From Different Channels

1203 ⟿ Determine Distance Between Received Signals

1205 ⟿ Group Signals Within Threshold Distance

1207 ⟿ Provide Signals Based On Grouping

End

CHANNEL FUSION USING MULTIPLE MEASUREMENTS

BACKGROUND OF THE INVENTION

Light detection and ranging (lidar) is a technology that can be used to measure distances to remote targets. Typically, a lidar system includes a light source and an optical receiver. The light source can include, for example, a laser which emits light having a particular operating wavelength. The operating wavelength of a lidar system may lie, for example, in the infrared, visible, or ultraviolet portions of the electromagnetic spectrum. The light source emits light towards a target which scatters the light, and some of the scattered light is received back at the receiver. The system determines the distance to the target based on one or more characteristics associated with the received light. For example, the lidar system may determine the distance to the target based on the time of flight for a pulse of light emitted by the light source to travel to the target and back to the lidar system.

BRIEF DESCRIPTION OF THE DRAWINGS

Various embodiments of the invention are disclosed in the following detailed description and the accompanying drawings.

DETAILED DESCRIPTION

Figure 1:
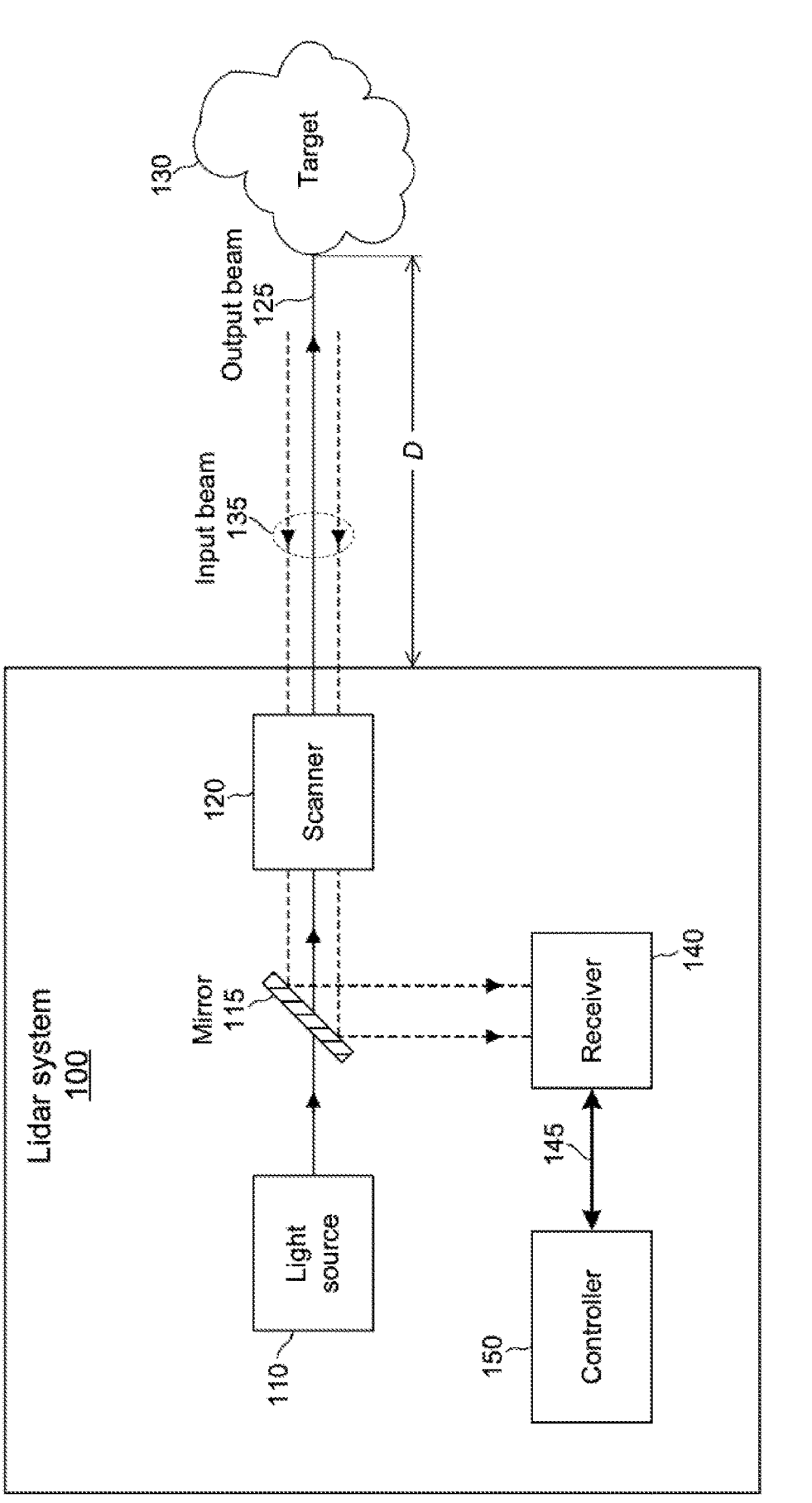
FIG. 1 illustrates an example light detection and ranging (lidar) system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Channel fusion using multiple measurements is disclosed. For example, a lidar system can be configured with a receiver that utilizes one or more photosites or detector site locations. Each detector location can be configured to output multiple signals, each associated with a different channel. In some embodiments, the energy or photocurrent at each detector can be subjected to different gains. For example, multiple gain channels including superlow, low, medium, and/or high gain channels can be configured for each detector site. Based on the outputted measurement signals from each channel, different measurement signals are associated with one another and used to determine a final output reading. For example, a weak return detected by a detector site may be immeasurable on the superlow gain channel but yield useful measurements on medium and high gain channels. As another example, a strong return may saturate both high and medium gain channels but yield useful information on a superlow gain channel. Moreover, since a return pulse can be detected by multiple detector site locations and the overlap between the return pulse and a detector site location is generally different for each site, different amounts of energy are absorbed by each detector resulting in potentially different measurements. Thus, returns that are unusable from one detector site location may correspond to useful measurements for an adjacent detector. For example, for extremely strong returns that saturate even a superlow gain channel, the outlying areas of the same return pulse may yield useful information on a high gain channel of another site location.

In various embodiments, measurement association is performed to identify and group together different measurements that correspond to the same target. For example, different output measurements including measurements from different detector site locations are analyzed to determine which measurements correspond to the same return pulse. As one example, a measurement from the low gain channel from one site can be associated with measurements from the medium gain and high gain channels from a second site. In some embodiments, a distance measurement can be computed to determine whether the different measurements correspond to the same target. For example, for certain range measurements, in the event the difference in range between two channels is below a configured threshold, the measurements can be associated together and identified as corresponding to the same received pulse. Other association techniques are appropriate as well, such as applying a cost function and/or other techniques, and can further utilize higher-dimensional features such as pulse morphology and/ or prior information such as knowledge that a pulse with a particular energy and range on one channel should likely result in a measurement with a certain energy and range on another channel.

In various embodiments, once measurements are associated with one another, the associated measurements are fused to arrive at a single estimate of one or more features of interest of the desired target and/or incident pulse. By fusing measurements including measurements that correspond to different regions of the system's total dynamic range, a more accurate single estimate can be determined. In various embodiments, the use of multiple channels to determine a single estimate reduces the variance in the determined final outputted measurement and improves the overall dynamic range of the lidar system. In some embodiments, the measurements associated with the same return pulse are fused by weighing more reliable measurements more heavily than unreliable measurements. For example, associated measurements can be weighted by the inverse of the estimated measurement variance. In some embodiments, machine learning models are trained to infer a set of inputs into a fused final output. Other weighting techniques are also possible, such as those incorporating prior information from a corpus of training data. For example, prior information can be based on known values and their distributions for given conditions.

In some embodiments, a system such as a lidar system comprises a light source configured to generate an emitted pulse of light. For example, the light is emitted downrange at one or more targets. The system further comprises a receiver with one or more detectors configured to detect at least a portion of the emitted pulse of light scattered by an external target and provide a plurality of different measurement signals for the detected emitted pulse of light. For example, a receiver can include two or more detectors, each configured to output one or more measurement signals. The different measurement signals can correspond to different gain channels, such as superlow, low, medium, and high gain channels. As an example, a return pulse corresponding to the emitted pulse of light is detected by multiple detectors of a receiver and each detector provides one or more measurement signals based on the detected return pulse. Each provided measurement signal can correspond to a different measurement of the same return pulse provided by a different channel. In some embodiments, the system further comprises a processor configured to analyze the plurality of different measurement signals to identify the plurality of different measurement signals as corresponding to the same external target and combine the identified plurality of different measurement signals to determine a measurement for the external target. For example, the different measurement signals are analyzed to determine which signals correspond to the same return pulse and target. Once the signals associated with the same pulse and target are identified, the different measurement signals are combined and fused to determine a final measurement value. The final measurement value can have an improved dynamic range compared to a single measurement. In various embodiments, by relying on multiple different measurement signals, the final measurement value is also significantly more accurate. In various embodiments, the measurement signals can correspond to different features of the external target such as range, reflectance, or another target feature.

A lidar system operates in a vehicle and includes multiple "eyes," each of which has its own field of regard, or an angular range over which the eye scans targets using pulses of light in accordance with a scan pattern. The fields of regard can combine along a certain dimension (e.g., horizontally) to define the overall field of regard of the lidar system. The lidar system then can use data received via both eyes to generate a point cloud or otherwise process the received data.

In a two-eye configuration of the lidar system, the two eyes can be housed together and scan the respective fields of regard via a shared window or separate windows, or the eyes can be housed separately. In the latter case, an assembly referred to as a "sensor head" can include a scanner, a receiver, and an optical element such as a collimator or a laser diode to generate or convey a beam of light.

Depending on the implementation, each eye of a lidar system can include a separate scanner (e.g., each eye can be equipped with a pivotable scan mirror to scan the field of regard vertically and another pivotable scan mirror to scan the field of regard horizontally), a partially shared scanner (e.g., each eye can be equipped with a pivotable scan mirror to scan the field of regard vertically, and a shared polygon mirror can scan the corresponding fields of regard horizontally, using different reflective surfaces), or a fully shared scanner (e.g., a pivotable planar mirror can scan the fields of regard vertically by reflecting incident beams at different regions on the reflective surface, and a shared polygon mirror can scan the corresponding fields of regard horizontally, using different reflective surfaces).

Different hardware configurations allow the lidar system to operate the eyes more independently of each other, as is the case with separate scanners, or less independently, as is the case with a fully shared scanner. For example, the two or more eyes may scan the respective fields of regard using similar or different scan patterns. In one implementation, the two eyes trace out the same pattern, but with a certain time differential to maintain angular separation between light-source fields of view and thereby reduce the probability of cross-talk events between the sensor heads. In another implementation, the two eyes scan the corresponding fields of regard according to different scan patterns, at least in some operational states (e.g., when the vehicle is turning right or left).

Further, according to one approach, two eyes of a lidar system are arranged so that the fields of regard of the eyes are adjacent and non-overlapping. For example, each field of regard can span approximately 60 degrees horizontally and 30 degrees vertically, so that the combined field of regard of the lidar system spans approximately 120 degrees horizontally and 30 degrees vertically. The corresponding scanners (or paths within a shared scanner) can point away from each other at a certain angle, for example, so that the respective fields of regard abut approximately at an axis corresponding to the forward-facing direction of the vehicle.

Alternatively, the lidar system can operate in a "cross-eyed" configuration to create an area of overlap between the fields of regard. The area of overlap can be approximately centered along the forward-facing direction or another direction, which in some implementations a controller can determine dynamically. In this implementation, the two sensor heads can yield a higher density of scan in the area that generally is more important. In some implementations, the fields of regard in a cross-eyed two-eye configuration are offset from each other by a half-pixel value, so that the area of overlap has twice as many pixels. In general, the fields of regard can overlap angularly or translationally. To reduce the probability of cross-talk events (e.g., the situation when a pulse emitted by the light source associated with the first eye is received by the receiver of the second eye), the lidar system can use output beams with different wavelengths.

FIG. 1 illustrates an example light detection and ranging (lidar) system 100. In particular embodiments, a lidar system 100 may be referred to as a laser ranging system, a laser radar system, a LIDAR system, a lidar sensor, or a laser detection and ranging (LADAR or ladar) system. In particular embodiments, a lidar system 100 may include a light source 110, mirror 115, scanner 120, receiver 140, or controller 150. The light source 110 may include, for example, a laser which emits light having a particular operating wavelength in the infrared, visible, or ultraviolet portions of the electromagnetic spectrum. As an example, light source 110 may include a laser with one or more operating wavelengths between approximately 900 nanometers (nm) and 2100 nm. The light source 110 emits an output beam of light 125 which may be continuous wave (CW), pulsed, or modulated in any suitable manner for a given application. The output beam of light 125 is directed downrange toward a remote target 130. As an example, the remote target 130 may be located a distance D of approximately 1 m to 1 km from the lidar system 100.

Once the output beam 125 reaches the downrange target 130, the target may scatter or reflect at least a portion of light from the output beam 125, and some of the scattered or reflected light may return toward the lidar system 100. In the example of FIG. 1, the scattered or reflected light is represented by input beam 135, which passes through scanner 120 and is reflected by mirror 115 and directed to receiver 140. In particular embodiments, a relatively small fraction of the light from output beam 125 may return to the lidar system 100 as input beam 135. As an example, the ratio of input beam 135 average power, peak power, or pulse energy to output beam 125 average power, peak power, or pulse energy may be approximately $10^{-1}$, $10^{-2}$, $10^{-3}$, $10^{-4}$, $10^{-5}$, $10^{-6}$, $10^{-7}$, $10^{-8}$, $10^{-9}$, $10^{-10}$, $10^{-11}$, or $10^{-12}$. As another example, if a pulse of output beam 125 has a pulse energy of 1 microjoule (μJ), then the pulse energy of a corresponding pulse of input beam 135 may have a pulse energy of approximately 10 nanojoules (nJ), 1 nJ, 100 picojoules (pJ), 10 pJ, 1 pJ, 100 femtojoules (fJ), 10 fJ, 1 fJ, 100 attojoules (aJ), 10 aJ, 1 aJ, or 0.1 aJ. In some embodiments, the pulse energy of a pulse of input beam 135 can at times be as large as the pulse energy of a corresponding pulse of output beam 125.

In particular embodiments, output beam 125 may include or may be referred to as an optical signal, output optical signal, emitted optical signal, output light, emitted pulse of light, laser beam, light beam, optical beam, emitted beam, emitted light, or beam. In particular embodiments, input beam 135 may include or may be referred to as a received optical signal, received pulse of light, input pulse of light, input optical signal, return beam, received beam, return light, received light, input light, scattered light, or reflected light. As used herein, scattered light may refer to light that is scattered or reflected by a target 130. As an example, an input beam 135 may include: light from the output beam 125 that is scattered by target 130; light from the output beam 125 that is reflected by target 130; or a combination of scattered and reflected light from target 130.

In particular embodiments, receiver 140 may receive or detect photons from input beam 135 and produce one or more representative signals. For example, the receiver 140 may produce an output electrical signal 145 that is representative of the input beam 135, and the electrical signal 145 may be sent to controller 150. In particular embodiments, receiver 140 or controller 150 may include a processor, computing system (e.g., an ASIC or FPGA), or other suitable circuitry. A controller 150 may be configured to analyze one or more characteristics of the electrical signal 145 from the receiver 140 to determine one or more characteristics of the target 130, such as its distance downrange from the lidar system 100. This may be done, for example, by analyzing a time of flight or a frequency or phase of a transmitted beam of light 125 or a received beam of light 135. If lidar system 100 measures a time of flight of T (e.g., T represents a round-trip time of flight for an emitted pulse of light to travel from the lidar system 100 to the target 130 and back to the lidar system 100), then the distance D from the target 130 to the lidar system 100 may be expressed as $D=c \cdot T/2$, where c is the speed of light (approximately $3.0 \times 10^8$ m/s). As an example, if a time of flight is measured to be T=300 ns, then the distance from the target 130 to the lidar system 100 may be determined to be approximately D=45.0 m. As another example, if a time of flight is measured to be T=1.33 μs, then the distance from the target 130 to the lidar system 100 may be determined to be approximately D=199.5 m. In particular embodiments, a distance D from lidar system 100 to a target 130 may be referred to as a distance, depth, or range of target 130. As used herein, the speed of light c refers to the speed of light in any suitable medium, such as for example in air, water, or vacuum. As an example, the speed of light in vacuum is approximately $2.9979 \times 10^8$ m/s, and the speed of light in air (which has a refractive index of approximately 1.0003) is approximately $2.9970 \times 10^8$ m/s.

In particular embodiments, light source 110 may include a pulsed or CW laser. As an example, light source 110 may be a pulsed laser configured to produce or emit pulses of light with a pulse duration or pulse width of approximately 10 picoseconds (ps) to 100 nanoseconds (ns). The pulses may have a pulse duration of approximately 100 ps, 200 ps, 400 ps, 1 ns, 2 ns, 5 ns, 10 ns, 20 ns, 50 ns, 100 ns, or any other suitable pulse duration. As another example, light source 110 may be a pulsed laser that produces pulses with a pulse duration of approximately 1-5 ns. As another example, light source 110 may be a pulsed laser that produces pulses at a pulse repetition frequency of approximately 80 kHz to 10 MHz or a pulse period (e.g., a time between consecutive pulses) of approximately 100 ns to 12.5 us. In particular embodiments, light source 110 may have a substantially constant pulse repetition frequency, or light source 110 may have a variable or adjustable pulse repetition frequency. As an example, light source 110 may be a pulsed laser that produces pulses at a substantially constant pulse repetition frequency of approximately 640 kHz (e.g., 640,000 pulses per second), corresponding to a pulse period of approximately 1.56 μs. As another example, light source 110 may have a pulse repetition frequency (which may be referred to as a repetition rate) that can be varied from approximately 200 kHz to 3 MHz. As used herein, a pulse of light may be referred to as an optical pulse, a light pulse, or a pulse.

In particular embodiments, light source 110 may include a pulsed or CW laser that produces a free-space output beam 125 having any suitable average optical power. As an example, output beam 125 may have an average power of approximately 1 milliwatt (mW), 10 mW, 100 mW, 1 watt (W), 10 W, or any other suitable average power. In particular embodiments, output beam 125 may include optical pulses with any suitable pulse energy or peak optical power. As an example, output beam 125 may include pulses with a pulse energy of approximately 0.01 μJ, 0.1 μJ, 0.5 μJ, 1 μJ, 2 μJ, 10 μJ, 100 μJ, 1 mJ, or any other suitable pulse energy. As another example, output beam 125 may include pulses with a peak power of approximately 10 W, 100 W, 1 KW, 5 KW, 10 KW, or any other suitable peak power. The peak power ($P_{peak}$) of a pulse of light can be related to the pulse energy (I) by the expression $E=P_{peak}\cdot\Delta t$, where $\Delta t$ is the duration of the pulse, and the duration of a pulse may be defined as the full width at half maximum duration of the pulse. For example, an optical pulse with a duration of 1 ns and a pulse energy of 1 μJ has a peak power of approximately 1 kW. The average power ($P_{av}$) of an output beam 125 can be related to the pulse repetition frequency (PRF) and pulse energy by the expression $P_{av}=PRF\cdot E$. For example, if the pulse repetition frequency is 500 kHz, then the average power of an output beam 125 with 1-μJ pulses is approximately 0.5 W.

In particular embodiments, light source 110 may include a laser diode, such as for example, a Fabry-Perot laser diode, a quantum well laser, a distributed Bragg reflector (DBR) laser, a distributed feedback (DFB) laser, a vertical-cavity surface-emitting laser (VCSEL), a quantum dot laser diode, a grating-coupled surface-emitting laser (GCSEL), a slab-coupled optical waveguide laser (SCOWL), a single-transverse-mode laser diode, a multi-mode broad area laser diode, a laser-diode bar, a laser-diode stack, or a tapered-stripe laser diode. As an example, light source 110 may include an aluminum-gallium-arsenide (AlGaAs) laser diode, an indium-gallium-arsenide (InGaAs) laser diode, an indium-gallium-arsenide-phosphide (InGaAsP) laser diode, or a laser diode that includes any suitable combination of aluminum (Al), indium (In), gallium (Ga), arsenic (As), phosphorous (P), or any other suitable material. In particular embodiments, light source 110 may include a pulsed or CW laser diode with a peak emission wavelength between 1200 nm and 1600 nm. As an example, light source 110 may include a current-modulated InGaAsP DFB laser diode that produces optical pulses at a wavelength of approximately 1550 nm. As another example, light source 110 may include a laser diode that emits light at a wavelength between 1500 nm and 1510 nm.

In particular embodiments, light source 110 may include a pulsed or CW laser diode followed by one or more optical-amplification stages. For example, a seed laser diode may produce a seed optical signal, and an optical amplifier may amplify the seed optical signal to produce an amplified optical signal that is emitted by the light source 110. In particular embodiments, an optical amplifier may include a fiber-optic amplifier or a semiconductor optical amplifier (SOA). For example, a pulsed laser diode may produce relatively low-power optical seed pulses which are amplified by a fiber-optic amplifier. As another example, a light source 110 may include a fiber-laser module that includes a current-modulated laser diode with an operating wavelength of approximately 1550 nm followed by a single-stage or a multi-stage erbium-doped fiber amplifier (EDFA) or erbium-ytterbium-doped fiber amplifier (EYDFA) that amplifies the seed pulses from the laser diode. As another example, light source 110 may include a continuous-wave (CW) or quasi-CW laser diode followed by an external optical modulator (e.g., an electro-optic amplitude modulator). The optical modulator may modulate the CW light from the laser diode to produce optical pulses which are sent to a fiber-optic amplifier or SOA. As another example, light source 110 may include a pulsed or CW seed laser diode followed by a semiconductor optical amplifier (SOA). The SOA may include an active optical waveguide configured to receive a seed optical signal (e.g., pulses of light or CW light) from the seed laser diode and amplify the seed optical signal as it propagates through the waveguide. For example, the seed laser diode may produce relatively low-power seed optical pulses, and the SOA may amplify each seed optical pulse to produce an emitted pulse of light. The optical gain of the SOA may be provided by pulsed or direct-current (DC) electrical current supplied to the SOA. The SOA may be integrated on the same chip as the seed laser diode, or the SOA may be a separate device with an anti-reflection coating on its input facet or output facet. As another example, light source 110 may include a seed laser diode followed by an SOA, which in turn is followed by a fiber-optic amplifier. For example, the seed laser diode may produce relatively low-power seed optical pulses which are amplified by the SOA, and the fiber-optic amplifier may further amplify each of the optical pulses to produce emitted pulses of light.

In particular embodiments, light source 110 may include a direct-emitter laser diode. A direct-emitter laser diode (which may be referred to as a direct emitter) may include a laser diode which produces light that is not subsequently amplified by an optical amplifier. A light source 110 that includes a direct-emitter laser diode may not include an optical amplifier, and the output light produced by a direct emitter may not be amplified after it is emitted by the laser diode. The light produced by a direct-emitter laser diode (e.g., optical pulses, CW light, or frequency-modulated light) may be emitted directly as a free-space output beam 125 without being amplified. A direct-emitter laser diode may be driven by an electrical power source that supplies current pulses to the laser diode, and each current pulse may result in the emission of an output optical pulse.

In particular embodiments, light source 110 may include a diode-pumped solid-state (DPSS) laser. A DPSS laser (which may be referred to as a solid-state laser) may refer to a laser that includes a solid-state, glass, ceramic, or crystal-based gain medium that is pumped by one or more pump laser diodes. The gain medium may include a host material that is doped with rare-earth ions (e.g., neodymium, erbium, ytterbium, or praseodymium). For example, a gain medium may include a yttrium aluminum garnet (YAG) crystal that is doped with neodymium (Nd) ions, and the gain medium may be referred to as a Nd:YAG crystal. A DPSS laser with a Nd:YAG gain medium may produce light at a wavelength between approximately 1300 nm and approximately 1400 nm, and the Nd:YAG gain medium may be pumped by one or more pump laser diodes with an operating wavelength between approximately 730 nm and approximately 900 nm. A DPSS laser may be a passively Q-switched laser that includes a saturable absorber (e.g., a vanadium-doped crystal that acts as a saturable absorber). Alternatively, a DPSS laser may be an actively Q-switched laser that includes an active Q-switch (e.g., an acousto-optic modulator or an electro-optic modulator). A passively or actively Q-switched DPSS laser may produce output optical pulses that form an output beam 125 of a lidar system 100.

In particular embodiments, an output beam of light 125 emitted by light source 110 may be a collimated optical beam having any suitable beam divergence, such as for example, a full-angle beam divergence of approximately 0.5 to 10 milliradians (mrad). A divergence of output beam 125 may refer to an angular measure of an increase in beam size (e.g., a beam radius or beam diameter) as output beam 125 travels away from light source 110 or lidar system 100. In particular embodiments, output beam 125 may have a substantially circular cross section with a beam divergence characterized by a single divergence value. As an example, an output beam 125 with a circular cross section and a full-angle beam divergence of 2 mrad may have a beam diameter or spot size of approximately 20 cm at a distance of 100 m from lidar system 100. In particular embodiments, output beam 125 may have a substantially elliptical cross section characterized by two divergence values. As an example, output beam 125 may have a fast axis and a slow axis, where the fast-axis divergence is greater than the slow-axis divergence. As another example, output beam 125 may be an elliptical beam with a fast-axis divergence of 4 mrad and a slow-axis divergence of 2 mrad.

In particular embodiments, an output beam of light 125 emitted by light source 110 may be unpolarized or randomly polarized, may have no specific or fixed polarization (e.g., the polarization may vary with time), or may have a particular polarization (e.g., output beam 125 may be linearly polarized, elliptically polarized, or circularly polarized). As an example, light source 110 may produce light with no specific polarization or may produce light that is linearly polarized.

In particular embodiments, lidar system 100 may include one or more optical components configured to reflect, focus, filter, shape, modify, steer, or direct light within the lidar system 100 or light produced or received by the lidar system 100 (e.g., output beam 125 or input beam 135). As an example, lidar system 100 may include one or more lenses, mirrors, filters (e.g., bandpass or interference filters), beam splitters, optical splitters, polarizers, polarizing beam splitters, wave plates (e.g., half-wave or quarter-wave plates), diffractive elements, holographic elements, isolators, couplers, detectors, beam combiners, or collimators. The optical components in a lidar system 100 may be free-space optical components, fiber-coupled optical components, or a combination of free-space and fiber-coupled optical components.

In particular embodiments, lidar system 100 may include a telescope, one or more lenses, or one or more mirrors configured to expand, focus, or collimate the output beam 125 or the input beam 135 to a desired beam diameter or divergence. As an example, the lidar system 100 may include one or more lenses to focus the input beam 135 onto a photodetector of receiver 140. As another example, the lidar system 100 may include one or more flat mirrors or curved mirrors (e.g., concave, convex, or parabolic mirrors) to steer or focus the output beam 125 or the input beam 135. For example, the lidar system 100 may include an off-axis parabolic mirror to focus the input beam 135 onto a photodetector of receiver 140. As illustrated in FIG. 1, the lidar system 100 may include mirror 115 (which may be a metallic or dielectric mirror), and mirror 115 may be configured so that light beam 125 passes through the mirror 115 or passes along an edge or side of the mirror 115 and input beam 135 is reflected toward the receiver 140. As an example, mirror 115 (which may be referred to as an overlap mirror, superposition mirror, or beam-combiner mirror) may include a hole, slot, or aperture which output light beam 125 passes through. As another example, rather than passing through the mirror 115, the output beam 125 may be directed to pass alongside the mirror 115 with a gap (e.g., a gap of width approximately 0.1 mm, 0.5 mm, 1 mm, 2 mm, 5 mm, or 10 mm) between the output beam 125 and an edge of the mirror 115.

In particular embodiments, mirror 115 may provide for output beam 125 and input beam 135 to be substantially coaxial so that the two beams travel along approximately the same optical path (albeit in opposite directions). The input and output beams being substantially coaxial may refer to the beams being at least partially overlapped or sharing a common propagation axis so that input beam 135 and output beam 125 travel along substantially the same optical path (albeit in opposite directions). As an example, output beam 125 and input beam 135 may be parallel to each other to within less than 10 mrad, 5 mrad, 2 mrad, 1 mrad, 0.5 mrad, or 0.1 mrad. As output beam 125 is scanned across a field of regard, the input beam 135 may follow along with the output beam 125 so that the coaxial relationship between the two beams is maintained.

In particular embodiments, lidar system 100 may include a scanner 120 configured to scan an output beam 125 across a field of regard of the lidar system 100. As an example, scanner 120 may include one or more scanning mirrors configured to pivot, rotate, oscillate, or move in an angular manner about one or more rotation axes. The output beam 125 may be reflected by a scanning mirror, and as the scanning mirror pivots or rotates, the reflected output beam 125 may be scanned in a corresponding angular manner. As an example, a scanning mirror may be configured to periodically pivot back and forth over a 30-degree range, which results in the output beam 125 scanning back and forth across a 60-degree range (e.g., a 0-degree rotation by a scanning mirror results in a 20-degree angular scan of output beam 125).

In particular embodiments, a scanning mirror (which may be referred to as a scan mirror) may be attached to or mechanically driven by a scanner actuator or mechanism which pivots or rotates the mirror over a particular angular range (e.g., over a 5° angular range, 30° angular range, 60° angular range, 120° angular range, 360° angular range, or any other suitable angular range). A scanner actuator or mechanism configured to pivot or rotate a mirror may include a galvanometer scanner, a resonant scanner, a piezoelectric actuator, a voice coil motor, an electric motor (e.g., a DC motor, a brushless DC motor, a synchronous electric motor, or a stepper motor), a microelectromechanical systems (MEMS) device, or any other suitable actuator or mechanism. As an example, a scanner 120 may include a scanning mirror attached to a galvanometer scanner configured to pivot back and forth over a 1° to 30° angular range. As another example, a scanner 120 may include a scanning mirror that is attached to or is part of a MEMS device configured to scan over a 1° to 30° angular range. As another example, a scanner 120 may include a polygon mirror configured to rotate continuously in the same direction (e.g., rather than pivoting back and forth, the polygon mirror continuously rotates 360 degrees in a clockwise or counter-clockwise direction). The polygon mirror may be coupled or attached to a synchronous motor configured to rotate the polygon mirror at a substantially fixed rotational frequency (e.g., a rotational frequency of approximately 1 Hz, 10 Hz, 50 Hz, 100 Hz, 500 Hz, or 1,000 Hz).

In particular embodiments, scanner 120 may be configured to scan the output beam 125 (which may include at least a portion of the light emitted by light source 110) across a field of regard of the lidar system 100. A field of regard (FOR) of a lidar system 100 may refer to an area, region, or angular range over which the lidar system 100 may be configured to scan or capture distance information. As an example, a lidar system 100 with an output beam 125 with a 30-degree scanning range may be referred to as having a 30-degree angular field of regard. As another example, a lidar system 100 with a scanning mirror that rotates over a 30-degree range may produce an output beam 125 that scans across a 60-degree range (e.g., a 60-degree FOR). In particular embodiments, lidar system 100 may have a FOR of approximately 10°, 20°, 40°, 60°, 120°, 360°, or any other suitable FOR.

In particular embodiments, scanner 120 may be configured to scan the output beam 125 horizontally and vertically, and lidar system 100 may have a particular FOR along the horizontal direction and another particular FOR along the vertical direction. As an example, lidar system 100 may have a horizontal FOR of 10° to 120° and a vertical FOR of 2° to 45°. In particular embodiments, scanner 120 may include a first scan mirror and a second scan mirror, where the first scan mirror directs the output beam 125 toward the second scan mirror, and the second scan mirror directs the output beam 125 downrange from the lidar system 100. As an example, the first scan mirror may scan the output beam 125 along a first direction, and the second scan mirror may scan the output beam 125 along a second direction that is different from the first direction (e.g., the second direction may be substantially orthogonal to the first direction). As another example, the first scan mirror may scan the output beam 125 along a substantially horizontal direction, and the second scan mirror may scan the output beam 125 along a substantially vertical direction (or vice versa). As another example, the first and second scan mirrors may each be driven by galvanometer scanners. As another example, the first or second scan mirror may include a polygon mirror driven by an electric motor. In particular embodiments, scanner 120 may be referred to as a beam scanner, optical scanner, or laser scanner.

In particular embodiments, one or more scanning mirrors may be communicatively coupled to controller 150 which may control the scanning mirror(s) so as to guide the output beam 125 in a desired direction downrange or along a desired scan pattern. In particular embodiments, a scan pattern may refer to a pattern or path along which the output beam 125 is directed. As an example, scanner 120 may include two scanning mirrors configured to scan the output beam 125 across a 60° horizontal FOR and a 20° vertical FOR. The two scanner mirrors may be controlled to follow a scan path that substantially covers the 60°×20° FOR. As an example, the scan path may result in a point cloud with pixels that substantially cover the 60°×20° FOR. The pixels may be approximately evenly distributed across the 60°×20° FOR. Alternatively, the pixels may have a particular non-uniform distribution (e.g., the pixels may be distributed across all or a portion of the 60°×20° FOR, and the pixels may have a higher density in one or more particular regions of the 60°×20° FOR).

In particular embodiments, a lidar system 100 may include a scanner 120 with a solid-state scanning device. A solid-state scanning device may refer to a scanner 120 that scans an output beam 125 without the use of moving parts (e.g., without the use of a mechanical scanner, such as a mirror that rotates or pivots). For example, a solid-state scanner 120 may include one or more of the following: an optical phased array scanning device; a liquid-crystal scanning device; or a liquid lens scanning device. A solid-state scanner 120 may be an electrically addressable device that scans an output beam 125 along one axis (e.g., horizontally) or along two axes (e.g., horizontally and vertically). In particular embodiments, a scanner 120 may include a solid-state scanner and a mechanical scanner. For example, a scanner 120 may include an optical phased array scanner configured to scan an output beam 125 in one direction and a galvanometer scanner that scans the output beam 125 in an orthogonal direction. The optical phased array scanner may scan the output beam relatively rapidly in a horizontal direction across the field of regard (e.g., at a scan rate of 50 to 1,000 scan lines per second), and the galvanometer may pivot a mirror at a rate of 1-30 Hz to scan the output beam 125 vertically.

In particular embodiments, a lidar system 100 may include a light source 110 configured to emit pulses of light and a scanner 120 configured to scan at least a portion of the emitted pulses of light across a field of regard of the lidar system 100. One or more of the emitted pulses of light may be scattered by a target 130 located downrange from the lidar system 100, and a receiver 140 may detect at least a portion of the pulses of light scattered by the target 130. A receiver 140 may be referred to as a photoreceiver, optical receiver, optical sensor, detector, photodetector, or optical detector. In particular embodiments, lidar system 100 may include a receiver 140 that receives or detects at least a portion of input beam 135 and produces an electrical signal that corresponds to input beam 135. As an example, if input beam 135 includes an optical pulse, then receiver 140 may produce an electrical current or voltage pulse that corresponds to the optical pulse detected by receiver 140. As another example, receiver 140 may include one or more avalanche photodiodes (APDs) or one or more single-photon avalanche diodes (SPADs). As another example, receiver 140 may include one or more PN photodiodes (e.g., a photodiode structure formed by a p-type semiconductor and an n-type semiconductor, where the PN acronym refers to the structure having p-doped and n-doped regions) or one or more PIN photodiodes (e.g., a photodiode structure formed by an undoped intrinsic semiconductor region located between p-type and n-type regions, where the PIN acronym refers to the structure having p-doped, intrinsic, and n-doped regions). An APD, SPAD, PN photodiode, or PIN photodiode may each be referred to as a detector, photodetector, or photodiode. A detector may have an active region or an avalanche-multiplication region that includes silicon, germanium, InGaAs, InAsSb (indium arsenide antimonide), AlAsSb (aluminum arsenide antimonide), or AlInAsSb (aluminum indium arsenide antimonide). The active region may refer to an area over which a detector may receive or detect input light. An active region may have any suitable size or diameter, such as for example, a diameter of approximately 10 μm, 25 μm, 50 μm, 80 μm, 100 μm, 200 μm, 500 μm, 1 mm, 2 mm, or 5 mm.

In particular embodiments, receiver 140 may include electronic circuitry that performs signal amplification, sampling, filtering, signal conditioning, analog-to-digital conversion, time-to-digital conversion, pulse detection, threshold detection, rising-edge detection, or falling-edge detection. As an example, receiver 140 may include a transimpedance amplifier that converts a received photocurrent (e.g., a current produced by an APD in response to a received optical signal) into a voltage signal. The voltage signal may be sent to signal-detection circuitry that produces an analog or digital output signal 145 that corresponds to one or more optical characteristics (e.g., rising edge, falling edge, amplitude, duration, or energy) of a received optical pulse. As an example, the signal-detection circuitry may perform a time-to-digital conversion to produce a digital output signal 145. The electrical output signal 145 may be sent to controller 150 for processing or analysis (e.g., to determine a time-of-flight value corresponding to a received optical pulse).

In particular embodiments, a controller 150 (which may include or may be referred to as a processor, an FPGA, an ASIC, a computer, or a computing system) may be located within a lidar system 100 or outside of a lidar system 100. Alternatively, one or more parts of a controller 150 may be located within a lidar system 100, and one or more other parts of a controller 150 may be located outside a lidar system 100. In particular embodiments, one or more parts of a controller 150 may be located within a receiver 140 of a lidar system 100, and one or more other parts of a controller 150 may be located in other parts of the lidar system 100. For example, a receiver 140 may include an FPGA or ASIC configured to process an output electrical signal from the receiver 140, and the processed signal may be sent to a computing system located elsewhere within the lidar system 100 or outside the lidar system 100. In particular embodiments, a controller 150 may include any suitable arrangement or combination of logic circuitry, analog circuitry, or digital circuitry.

In particular embodiments, controller 150 may be electrically coupled or communicatively coupled to light source 110, scanner 120, or receiver 140. As an example, controller 150 may receive electrical trigger pulses or edges from light source 110, where each pulse or edge corresponds to the emission of an optical pulse by light source 110. As another example, controller 150 may provide instructions, a control signal, or a trigger signal to light source 110 indicating when light source 110 should produce optical pulses. Controller 150 may send an electrical trigger signal that includes electrical pulses, where each electrical pulse results in the emission of an optical pulse by light source 110. In particular embodiments, the frequency, period, duration, pulse energy, peak power, average power, or wavelength of the optical pulses produced by light source 110 may be adjusted based on instructions, a control signal, or trigger pulses provided by controller 150. In particular embodiments, controller 150 may be coupled to light source 110 and receiver 140, and controller 150 may determine a time-of-flight value for an optical pulse based on timing information associated with when the pulse was emitted by light source 110 and when a portion of the pulse (e.g., input beam 135) was detected or received by receiver 140. In particular embodiments, controller 150 may include circuitry that performs signal amplification, sampling, filtering, signal conditioning, analog-to-digital conversion, time-to-digital conversion, pulse detection, threshold detection, rising-edge detection, or falling-edge detection.

In particular embodiments, lidar system 100 may include one or more processors (e.g., a controller 150) configured to determine a distance D from the lidar system 100 to a target 130 based at least in part on a round-trip time of flight for an emitted pulse of light to travel from the lidar system 100 to the target 130 and back to the lidar system 100. The target 130 may be at least partially contained within a field of regard of the lidar system 100 and located a distance D from the lidar system 100 that is less than or equal to an operating range ($R_{OP}$) of the lidar system 100. In particular embodiments, an operating range (which may be referred to as an operating distance) of a lidar system 100 may refer to a distance over which the lidar system 100 is configured to sense or identify targets 130 located within a field of regard of the lidar system 100. The operating range of lidar system 100 may be any suitable distance, such as for example, 25 m, 50 m, 100 m, 200 m, 250 m, 500 m, or 1 km. As an example, a lidar system 100 with a 200-m operating range may be configured to sense or identify various targets 130 located up to 200 m away from the lidar system 100. The operating range $R_{OP}$ of a lidar system 100 may be related to the time t between the emission of successive optical signals by the expression $R_{OP}=c \cdot \tau/2$. For a lidar system 100 with a 200-m operating range ($R_{OP}$=200 m), the time t between successive pulses (which may be referred to as a pulse period, a pulse repetition interval (PRI), or a time period between pulses) is approximately $2 \cdot R_{OP}/c \cong 1.33$ µs. The pulse period t may also correspond to the time of flight for a pulse to travel to and from a target 130 located a distance $R_{OP}$ from the lidar system 100. Additionally, the pulse period t may be related to the pulse repetition frequency (PRF) by the expression $\tau=1/PRI$. For example, a pulse period of 1.33 µs corresponds to a PRF of approximately 752 kHz.

In particular embodiments, a lidar system 100 may be used to determine the distance to one or more downrange targets 130. By scanning the lidar system 100 across a field of regard, the system may be used to map the distance to a number of points within the field of regard. Each of these depth-mapped points may be referred to as a pixel or a voxel. A collection of pixels captured in succession (which may be referred to as a depth map, a point cloud, or a frame) may be rendered as an image or may be analyzed to identify or detect objects or to determine a shape or distance of objects within the FOR. As an example, a point cloud may cover a field of regard that extends 60° horizontally and 15° vertically, and the point cloud may include a frame of 100-2000 pixels in the horizontal direction by 4-400 pixels in the vertical direction.

In particular embodiments, lidar system 100 may be configured to repeatedly capture or generate point clouds of a field of regard at any suitable frame rate between approximately 0.1 frames per second (FPS) and approximately 1,000 FPS. As an example, lidar system 100 may generate point clouds at a frame rate of approximately 0.1 FPS, 0.5 FPS, 1 FPS, 2 FPS, 5 FPS, 10 FPS, 20 FPS, 100 FPS, 500 FPS, or 1,000 FPS. As another example, lidar system 100 may be configured to produce optical pulses at a rate of $5 \times 10^5$ pulses/second (e.g., the system may determine 500,000 pixel distances per second) and scan a frame of 1000×50 pixels (e.g., 50,000 pixels/frame), which corresponds to a point-cloud frame rate of 10 frames per second (e.g., 10 point clouds per second). In particular embodiments, a point-cloud frame rate may be substantially fixed, or a point-cloud frame rate may be dynamically adjustable. As an example, a lidar system 100 may capture one or more point clouds at a particular frame rate (e.g., 1 Hz) and then switch to capture one or more point clouds at a different frame rate (e.g., 10 Hz). A slower frame rate (e.g., 1 Hz) may be used to capture one or more high-resolution point clouds, and a faster frame rate (e.g., 10 Hz) may be used to rapidly capture multiple lower-resolution point clouds.

In particular embodiments, a lidar system 100 may be configured to sense, identify, or determine distances to one or more targets 130 within a field of regard. As an example, a lidar system 100 may determine a distance to a target 130, where all or part of the target 130 is contained within a field of regard of the lidar system 100. All or part of a target 130 being contained within a FOR of the lidar system 100 may refer to the FOR overlapping, encompassing, or enclosing at least a portion of the target 130. In particular embodiments, target 130 may include all or part of an object that is moving or stationary relative to lidar system 100. As an example, target 130 may include all or a portion of a person, vehicle, motorcycle, truck, train, bicycle, wheelchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects. In particular embodiments, a target may be referred to as an object.

In particular embodiments, light source 110, scanner 120, and receiver 140 may be packaged together within a single housing, where a housing may refer to a box, case, or enclosure that holds or contains all or part of a lidar system 100. As an example, a lidar-system enclosure may contain a light source 110, mirror 115, scanner 120, and receiver 140 of a lidar system 100. Additionally, the lidar-system enclosure may include a controller 150. The lidar-system enclosure may also include one or more electrical connections for conveying electrical power or electrical signals to or from the enclosure. In particular embodiments, one or more components of a lidar system 100 may be located remotely from a lidar-system enclosure. As an example, all or part of light source 110 may be located remotely from a lidar-system enclosure, and pulses of light produced by the light source 110 may be conveyed to the enclosure via optical fiber. As another example, all or part of a controller 150 may be located remotely from a lidar-system enclosure.

In particular embodiments, light source 110 may include an eye-safe laser, or lidar system 100 may be classified as an eye-safe laser system or laser product. An eye-safe laser, laser system, or laser product may refer to a system that includes a laser with an emission wavelength, average power, peak power, peak intensity, pulse energy, beam size, beam divergence, exposure time, or scanned output beam such that emitted light from the system presents little or no possibility of causing damage to a person's eyes. As an example, light source 110 or lidar system 100 may be classified as a Class 1 laser product (as specified by the 60825-1:2014 standard of the International Electrotechnical Commission (IEC)) or a Class I laser product (as specified by Title 21, Section 1040.10 of the United States Code of Federal Regulations (CFR)) that is safe under all conditions of normal use. In particular embodiments, lidar system 100 may be an eye-safe laser product (e.g., with a Class 1 or Class I classification) configured to operate at any suitable wavelength between approximately 900 nm and approximately 2100 nm. As an example, lidar system 100 may include a laser with an operating wavelength between approximately 1200 nm and approximately 1400 nm or between approximately 1400 nm and approximately 1600 nm, and the laser or the lidar system 100 may be operated in an eye-safe manner. As another example, lidar system 100 may be an eye-safe laser product that includes a scanned laser with an operating wavelength between approximately 900 nm and approximately 1700 nm. As another example, lidar system 100 may be a Class 1 or Class I laser product that includes a laser diode, fiber laser, or solid-state laser with an operating wavelength between approximately 1200 nm and approximately 1600 nm. As another example, lidar system 100 may have operating wavelengths between approximately 1500 nm and approximately 1550 nm.

In particular embodiments, one or more lidar systems 100 may be integrated into a vehicle. As an example, multiple lidar systems 100 may be integrated into a car to provide a complete 360-degree horizontal FOR around the car. As another example, 2-10 lidar systems 100, each system having a 45-degree to 180-degree horizontal FOR, may be combined together to form a sensing system that provides a point cloud covering a 360-degree horizontal FOR. The lidar systems 100 may be oriented so that adjacent FORs have an amount of spatial or angular overlap to allow data from the multiple lidar systems 100 to be combined or stitched together to form a single or continuous 360-degree point cloud. As an example, the FOR of each lidar system 100 may have approximately 1-30 degrees of overlap with an adjacent FOR. In particular embodiments, a vehicle may refer to a mobile machine configured to transport people or cargo. For example, a vehicle may include, may take the form of, or may be referred to as a car, automobile, motor vehicle, truck, bus, van, trailer, off-road vehicle, farm vehicle, lawn mower, construction equipment, forklift, robot, golf cart, motorhome, taxi, motorcycle, scooter, bicycle, skateboard, train, snowmobile, watercraft (e.g., a ship or boat), aircraft (e.g., a fixed-wing aircraft, helicopter, or dirigible), unmanned aerial vehicle (e.g., drone), or spacecraft. In particular embodiments, a vehicle may include an internal combustion engine or an electric motor that provides propulsion for the vehicle.

In particular embodiments, one or more lidar systems 100 may be included in a vehicle as part of an advanced driver assistance system (ADAS) to assist a driver of the vehicle in operating the vehicle. For example, a lidar system 100 may be part of an ADAS that provides information (e.g., about the surrounding environment) or feedback to a driver (e.g., to alert the driver to potential problems or hazards) or that automatically takes control of part of a vehicle (e.g., a braking system or a steering system) to avoid collisions or accidents. A lidar system 100 may be part of a vehicle ADAS that provides adaptive cruise control, automated braking, automated parking, collision avoidance, alerts the driver to hazards or other vehicles, maintains the vehicle in the correct lane, or provides a warning if an object or another vehicle is in a blind spot.

In particular embodiments, one or more lidar systems 100 may be integrated into a vehicle as part of an autonomous-vehicle driving system. As an example, a lidar system 100 may provide information about the surrounding environment to a driving system of an autonomous vehicle. An autonomous-vehicle driving system may be configured to guide the autonomous vehicle through an environment surrounding the vehicle and toward a destination. An autonomous-vehicle driving system may include one or more computing systems that receive information from a lidar system 100 about the surrounding environment, analyze the received information, and provide control signals to the vehicle's driving systems (e.g., steering mechanism, accelerator, brakes, lights, or turn signals). As an example, a lidar system 100 integrated into an autonomous vehicle may provide an autonomous-vehicle driving system with a point cloud every 0.1 seconds (e.g., the point cloud has a 10 Hz update rate, representing 10 frames per second). The autonomous-vehicle driving system may analyze the received point clouds to sense or identify targets 130 and their respective locations, distances, or speeds, and the autonomous-vehicle driving system may update control signals based on this information. As an example, if lidar system 100 detects a vehicle ahead that is slowing down or stopping, the autonomous-vehicle driving system may send instructions to release the accelerator and apply the brakes.

In particular embodiments, an autonomous vehicle may be referred to as an autonomous car, driverless car, self-driving car, robotic car, or unmanned vehicle. In particular embodiments, an autonomous vehicle may refer to a vehicle configured to sense its environment and navigate or drive with little or no human input. As an example, an autonomous vehicle may be configured to drive to any suitable location and control or perform all safety-critical functions (e.g., driving, steering, braking, parking) for the entire trip, with the driver not expected to control the vehicle at any time. As another example, an autonomous vehicle may allow a driver to safely turn their attention away from driving tasks in particular environments (e.g., on freeways), or an autonomous vehicle may provide control of a vehicle in all but a few environments, requiring little or no input or attention from the driver.

In particular embodiments, an autonomous vehicle may be configured to drive with a driver present in the vehicle, or an autonomous vehicle may be configured to operate the vehicle with no driver present. As an example, an autonomous vehicle may include a driver's seat with associated controls (e.g., steering wheel, accelerator pedal, and brake pedal), and the vehicle may be configured to drive with no one seated in the driver's seat or with little or no input from a person seated in the driver's seat. As another example, an autonomous vehicle may not include any driver's seat or associated driver's controls, and the vehicle may perform substantially all driving functions (e.g., driving, steering, braking, parking, and navigating) without human input. As another example, an autonomous vehicle may be configured to operate without a driver (e.g., the vehicle may be configured to transport human passengers or cargo without a driver present in the vehicle). As another example, an autonomous vehicle may be configured to operate without any human passengers (e.g., the vehicle may be configured for transportation of cargo without having any human passengers onboard the vehicle).

In particular embodiments, an optical signal (which may be referred to as a light signal, a light waveform, an optical waveform, an output beam, or emitted light) may include pulses of light, CW light, amplitude-modulated light, frequency-modulated (FM) light, or any suitable combination thereof. For example, a lidar system 100 as described or illustrated herein may be a pulsed lidar system and may include a light source 110 that produces pulses of light. The pulsed lidar system 100 may include a light source 110 that emits an output beam 125 with optical pulses having one or more of the following optical characteristics: a wavelength between 900 nm and 2100 nm (e.g., a wavelength of approximately 905 nm, a wavelength between 1500 nm and 1510 nm, a wavelength between 1400 nm and 1600 nm, or any other suitable operating wavelength between 900 nm and 2100 nm); a pulse energy between 0.01 µJ and 100 µJ; a pulse repetition frequency between 80 kHz and 10 MHz; and a pulse duration between 1 ns and 100 ns. For example, the light source 110 in FIG. 1 or FIG. 3 may emit an output beam 125 with optical pulses having a wavelength of approximately 1550 nm, a pulse energy of approximately 0.5 µJ, a pulse repetition frequency of approximately 600 kHz, and a pulse duration of approximately 5 ns. Although this disclosure describes or illustrates example embodiments of lidar systems 100 or light sources 110 that produce optical signals that include pulses of light, the embodiments described or illustrated herein may also be applied, where appropriate, to other types of optical signals, including continuous-wave (CW) light, amplitude-modulated optical signals, or frequency-modulated optical signals. For example, a lidar system 100 may be configured to operate as a frequency-modulated continuous-wave (FMCW) lidar system and may include a light source 110 that produces CW light or a frequency-modulated optical signal.

In particular embodiments, a lidar system 100 may be an FMCW lidar system where the emitted light from the light source 110 (e.g., output beam 125 in FIG. 1 or FIG. 3) includes frequency-modulated light. A pulsed lidar system is a type of lidar system 100 in which the light source 110 emits pulses of light, and the distance to a remote target 130 is determined based on the round-trip time-of-flight for a pulse of light to travel to the target 130 and back. Another type of lidar system 100 is a frequency-modulated lidar system, which may be referred to as a frequency-modulated continuous-wave (FMCW) lidar system. An FMCW lidar system uses frequency-modulated light to determine the distance to a remote target 130 based on a frequency of received light (which includes emitted light scattered by the remote target) relative to a frequency of local-oscillator (LO) light. A round-trip time for the emitted light to travel to a target 130 and back to the lidar system may correspond to a frequency difference between the received scattered light and the LO light. A larger frequency difference may correspond to a longer round-trip time and a greater distance to the target 130.

A light source 110 for an FMCW lidar system may include at least one instance of (i) a direct-emitter laser diode, (ii) a seed laser diode followed by an SOA, (iii) a seed laser diode followed by a fiber-optic amplifier, or (iv) a seed laser diode followed by an SOA and then a fiber-optic amplifier. A seed laser diode or a direct-emitter laser diode may be operated in a CW manner (e.g., by driving the laser diode with a substantially constant DC current), and a frequency modulation may be provided by an external modulator (e.g., an electro-optic phase modulator may apply a frequency modulation to seed-laser light). Alternatively, a frequency modulation may be produced by applying a current modulation to a seed laser diode or a direct-emitter laser diode. The current modulation (which may be provided along with a DC bias current) may produce a corresponding refractive-index modulation in the laser diode, which results in a frequency modulation of the light emitted by the laser diode. The current-modulation component (and the corresponding frequency modulation) may have any suitable frequency or shape (e.g., piecewise linear, sinusoidal, triangle-wave, or sawtooth). For example, the current-modulation component (and the resulting frequency modulation of the emitted light) may increase or decrease monotonically over a particular time interval. As another example, the current-modulation component may include a triangle or sawtooth wave with an electrical current that increases or decreases linearly over a particular time interval, and the light emitted by the laser diode may include a corresponding frequency modulation in which the optical frequency increases or decreases approximately linearly over the particular time interval. For example, a light source 110 that emits light with a linear frequency change of 200 MHz over a 2-µs time interval may be referred to as having a frequency modulation m of $10^{14}$ Hz/s (or, 100 MHz/µs).

In addition to producing frequency-modulated emitted light, a light source 110 may also produce frequency-modulated local-oscillator (LO) light. The LO light may be coherent with the emitted light, and the frequency modulation of the LO light may match that of the emitted light. The LO light may be produced by splitting off a portion of the emitted light prior to the emitted light exiting the lidar system. Alternatively, the LO light may be produced by a seed laser diode or a direct-emitter laser diode that is part of the light source 110. For example, the LO light may be emitted from the back facet of a seed laser diode or a direct-emitter laser diode, or the LO light may be split off from the seed light emitted from the front facet of a seed laser diode. The received light (e.g., emitted light that is scattered by a target 130) and the LO light may each be frequency modulated, with a frequency difference or offset that corresponds to the distance to the target 130. For a linearly chirped light source (e.g., a frequency modulation that produces a linear change in frequency with time), the larger the frequency difference is between the received light and the LO light, the farther away the target 130 is located.

A frequency difference between received light and LO light may be determined by mixing the received light with the LO light (e.g., by coupling the two beams onto a detector 340 of a receiver 140 so they are coherently mixed together at the detector) and determining the resulting beat frequency. For example, a photocurrent signal produced by an APD may include a beat signal resulting from the coherent mixing of the received light and the LO light, and a frequency of the beat signal may correspond to the frequency difference between the received light and the LO light. The photocurrent signal from an APD (or a voltage signal that corresponds to the photocurrent signal) may be analyzed using a frequency-analysis technique (e.g., a fast Fourier transform (FFT) technique) to determine the frequency of the beat signal. If a linear frequency modulation m (e.g., in units of Hz/s) is applied to a CW laser, then the round-trip time T may be related to the frequency difference $\Delta f$ between the received scattered light and the LO light by the expression $T=\Delta f/m$. Additionally, the distance D from the target 130 to the lidar system 100 may be expressed as $D=(\Delta f/m)\cdot c/2$, where c is the speed of light. For example, for a light source 110 with a linear frequency modulation of $10^{14}$ Hz/s, if a frequency difference (between the received scattered light and the LO light) of 33 MHz is measured, then this corresponds to a round-trip time of approximately 330 ns and a distance to the target of approximately 50 meters. As another example, a frequency difference of 133 MHz corresponds to a round-trip time of approximately 1.33 μs and a distance to the target of approximately 200 meters.

In particular embodiments, a receiver or processor of an FMCW lidar system may determine a frequency difference between received scattered light and LO light, and a distance to a target 130 may be determined based on the frequency difference. The frequency difference $\Delta f$ between received scattered light and LO light corresponds to the round-trip time T (e.g., through the relationship $T=\Delta f/m$), and determining the frequency difference may correspond to or may be referred to as determining the round-trip time. For example, a receiver of an FMCW lidar system may determine a frequency difference between received scattered light and LO light, and based on the determined frequency difference, a processor may determine a distance to the target.

Figure 2:
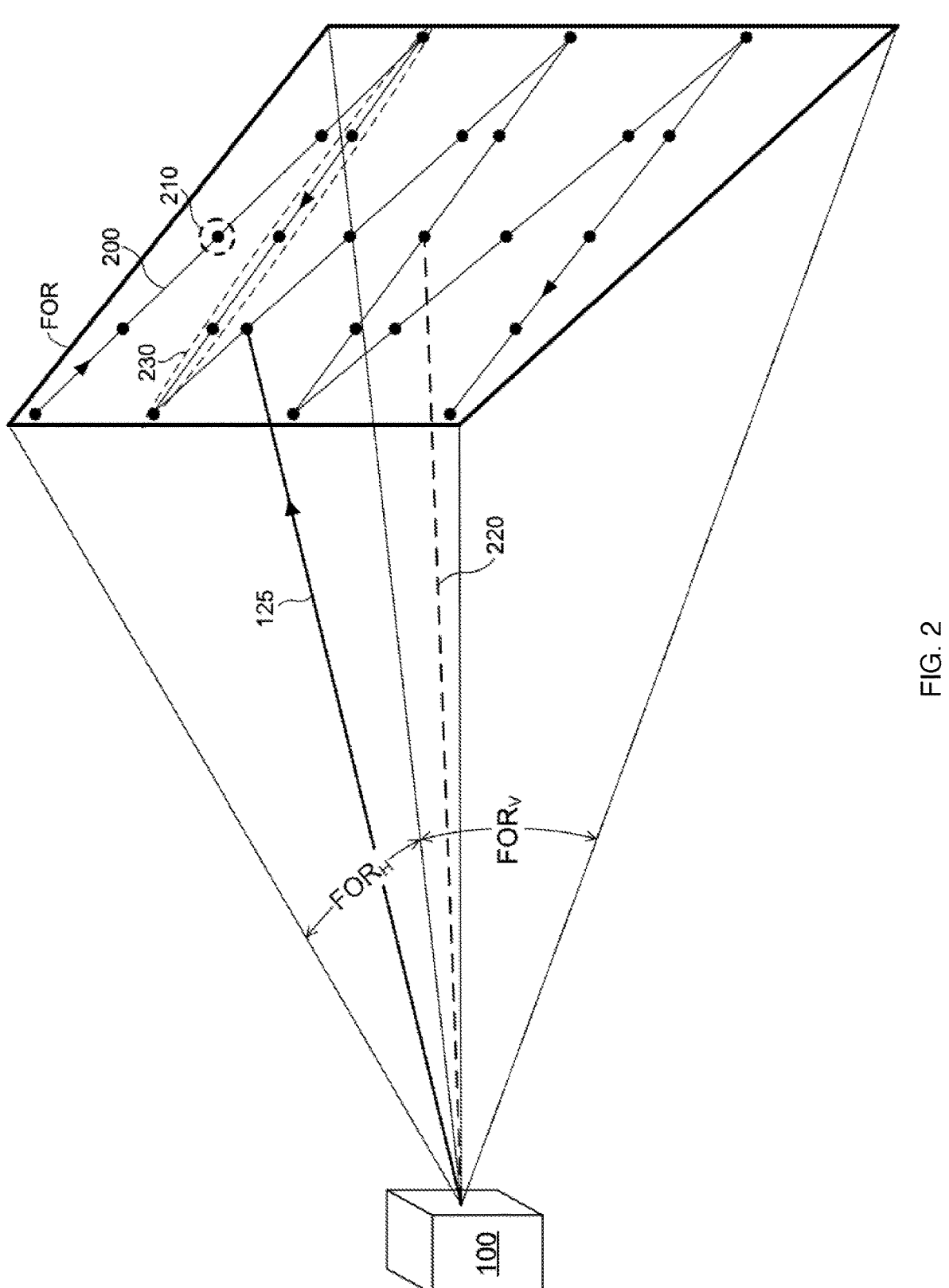
FIG. 2 illustrates an example scan pattern produced by a lidar system.

FIG. 2 illustrates an example scan pattern 200 produced by a lidar system 100. A scanner 120 of the lidar system 100 may scan the output beam 125 (which may include multiple emitted optical signals) along a scan pattern 200 that is contained within a field of regard (FOR) of the lidar system 100. A scan pattern 200 (which may be referred to as an optical scan pattern, optical scan path, scan path, or scan) may represent a path or course followed by output beam 125 as it is scanned across all or part of a FOR. Each traversal of a scan pattern 200 may correspond to the capture of a single frame or a single point cloud. In particular embodiments, a lidar system 100 may be configured to scan output optical beam 125 along one or more particular scan patterns 200. In particular embodiments, a scan pattern 200 may scan across any suitable field of regard (FOR) having any suitable horizontal FOR ($FOR_H$) and any suitable vertical FOR ($FOR_V$). For example, a scan pattern 200 may have a field of regard represented by angular dimensions (e.g., $FOR_H \times FOR_V$) 40°×30°, 90°×40°, or 60°×15°. As another example, a scan pattern 200 may have a $FOR_H$ greater than or equal to 10°, 25°, 30°, 40°, 60°, 90°, or 120°. As another example, a scan pattern 200 may have a $FOR_V$ greater than or equal to 2°, 5°, 10°, 15°, 20°, 30°, or 45°.

In the example of FIG. 2, reference line 220 represents a center of the field of regard of scan pattern 200. In particular embodiments, reference line 220 may have any suitable orientation, such as for example, a horizontal angle of 0° (e.g., reference line 220 may be oriented straight ahead) and a vertical angle of 0° (e.g., reference line 220 may have an inclination of) 0°, or reference line 220 may have a nonzero horizontal angle or a nonzero inclination (e.g., a vertical angle of +10° or −10°). In FIG. 2, if the scan pattern 200 has a 60°×15° field of regard, then scan pattern 200 covers a ±30° horizontal range with respect to reference line 220 and a ±7.5° vertical range with respect to reference line 220. Additionally, optical beam 125 in FIG. 2 has an orientation of approximately −15° horizontal and ±3° vertical with respect to reference line 220. Optical beam 125 may be referred to as having an azimuth of −15° and an altitude of +3° relative to reference line 220. In particular embodiments, an azimuth (which may be referred to as an azimuth angle) may represent a horizontal angle with respect to reference line 220, and an altitude (which may be referred to as an altitude angle, elevation, or elevation angle) may represent a vertical angle with respect to reference line 220.

In particular embodiments, a scan pattern 200 may include multiple pixels 210, and each pixel 210 may be associated with one or more laser pulses or one or more distance measurements. Additionally, a scan pattern 200 may include multiple scan lines 230, where each scan line represents one scan across at least part of a field of regard, and each scan line 230 may include multiple pixels 210. In FIG. 2, scan line 230 includes five pixels 210 and corresponds to an approximately horizontal scan across the FOR from right to left, as viewed from the lidar system 100. In particular embodiments, a cycle of scan pattern 200 may include a total of $P_x \times P_y$ pixels 210 (e.g., a two-dimensional distribution of $P_x$ by $P_y$ pixels). As an example, scan pattern 200 may include a distribution with dimensions of approximately 100-2,000 pixels 210 along a horizontal direction and approximately 4-400 pixels 210 along a vertical direction. As another example, scan pattern 200 may include a distribution of 1,000 pixels 210 along the horizontal direction by 64 pixels 210 along the vertical direction (e.g., the frame size is 1000×64 pixels) for a total of 64,000 pixels per cycle of scan pattern 200. In particular embodiments, the number of pixels 210 along a horizontal direction may be referred to as a horizontal resolution of scan pattern 200, and the number of pixels 210 along a vertical direction may be referred to as a vertical resolution. As an example, scan pattern 200 may have a horizontal resolution of greater than or equal to 100 pixels 210 and a vertical resolution of greater than or equal to 4 pixels 210. As another example, scan pattern 200 may have a horizontal resolution of 100-2,000 pixels 210 and a vertical resolution of 4-400 pixels 210.

In particular embodiments, each pixel 210 may be associated with a distance (e.g., a distance to a portion of a target 130 from which an associated laser pulse was scattered) or one or more angular values. As an example, a pixel 210 may be associated with a distance value and two angular values (e.g., an azimuth and altitude) that represent the angular location of the pixel 210 with respect to the lidar system 100. A distance to a portion of target 130 may be determined based at least in part on a time-of-flight measurement for a corresponding pulse. An angular value (e.g., an azimuth or altitude) may correspond to an angle (e.g., relative to reference line 220) of output beam 125 (e.g., when a corresponding pulse is emitted from lidar system 100) or an angle of input beam 135 (e.g., when an input signal is received by lidar system 100). In particular embodiments, an angular value may be determined based at least in part on a position of a component of scanner 120. As an example, an azimuth or altitude value associated with a pixel 210 may be determined from an angular position of one or more corresponding scanning mirrors of scanner 120.

Figure 3:
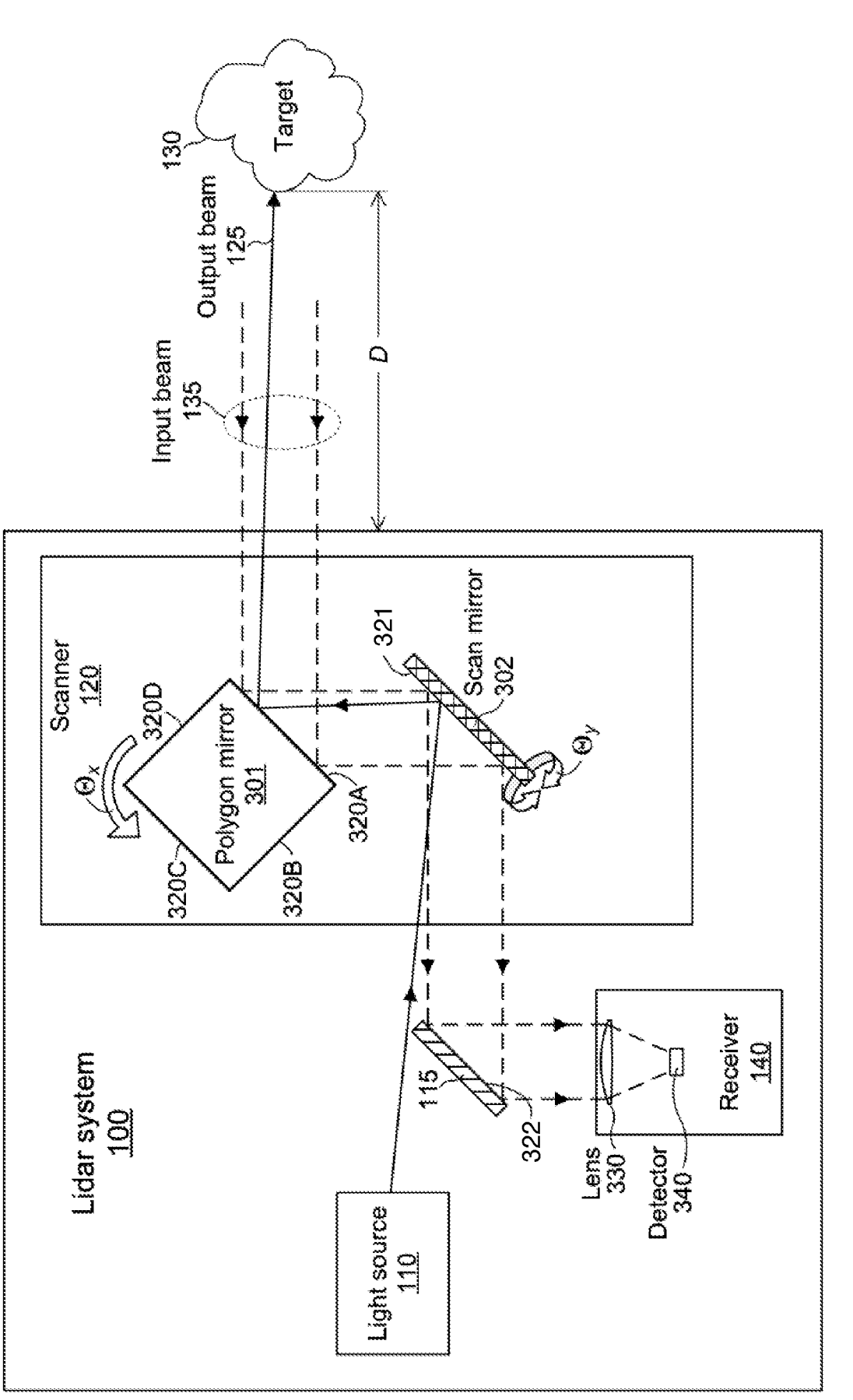
FIG. 3 illustrates an example lidar system with an example rotating polygon mirror.

FIG. 3 illustrates an example lidar system 100 with an example rotating polygon mirror 301. In particular embodiments, a scanner 120 may include a polygon mirror 301 configured to scan output beam 125 along a particular direction. In the example of FIG. 3, scanner 120 includes two scanning mirrors: (1) a polygon mirror 301 that rotates along the Θx direction and (2) a scanning mirror 302 that oscillates back and forth along the Θy direction. The output beam 125 from light source 110, which passes alongside mirror 115, is reflected by reflecting surface 321 of scan mirror 302 and is then reflected by a reflecting surface (e.g., surface 320A, 320B, 320C, or 320D) of polygon mirror 301. Scattered light from a target 130 returns to the lidar system 100 as input beam 135. The input beam 135 reflects from polygon mirror 301, scan mirror 302, and mirror 115, which directs input beam 135 through focusing lens 330 and to the detector 340 of receiver 140. As shown in FIG. 3, scan mirror 302 includes reflecting surface 321 and mirror 115 includes reflecting surface 322. The detector 340 may be a PN photodiode, a PIN photodiode, an APD, an SPAD, or any other suitable detector. A reflecting surface 320 (which may be referred to as a reflective surface) may include a reflective metallic coating (e.g., gold, silver, or aluminum) or a reflective dielectric coating, and the reflecting surface 320 may have any suitable reflectivity R at an operating wavelength of the light source 110 (e.g., R greater than or equal to 70%, 80%, 90%, 95%, 98%, or 99%).

In particular embodiments, a polygon mirror 301 may be configured to rotate along a $\Theta_x$ or $\Theta_y$ direction and scan output beam 125 along a substantially horizontal or vertical direction, respectively. A rotation along a $\Theta_x$ direction may refer to a rotational motion of mirror 301 that results in output beam 125 scanning along a substantially horizontal direction. Similarly, a rotation along a $\Theta_y$ direction may refer to a rotational motion that results in output beam 125 scanning along a substantially vertical direction. In FIG. 3, mirror 301 is a polygon mirror that rotates along the $\Theta_x$ direction and scans output beam 125 along a substantially horizontal direction, and mirror 302 pivots along the $\Theta_y$ direction and scans output beam 125 along a substantially vertical direction. In particular embodiments, a polygon mirror 301 may be configured to scan output beam 125 along any suitable direction. As an example, a polygon mirror 301 may scan output beam 125 at any suitable angle with respect to a horizontal or vertical direction, such as for example, at an angle of approximately 0°, 10°, 20°, 30°, 45°, 60°, 70°, 80°, or 90° with respect to a horizontal or vertical direction. Additionally, scan mirror 302 may scan the output beam 125 along any suitable direction that is different from the scan direction of the polygon mirror 301. For example, scan mirror 302 may scan the output beam 125 along a direction that is approximately orthogonal to the scan direction of the polygon mirror 301.

In particular embodiments, a polygon mirror 301 may refer to a multi-sided object having reflective surfaces 320 on two or more of its sides or faces. As an example, a polygon mirror may include any suitable number of reflective faces (e.g., 2, 3, 4, 5, 6, 7, 8, or 10 faces), where each face includes a reflective surface 320. A polygon mirror 301 may have a cross-sectional shape of any suitable polygon, such as for example, a triangle (with three reflecting surfaces 320), square (with four reflecting surfaces 320), pentagon (with five reflecting surfaces 320), hexagon (with six reflecting surfaces 320), heptagon (with seven reflecting surfaces 320), or octagon (with eight reflecting surfaces 320). In FIG. 3, the polygon mirror 301 has a substantially square cross-sectional shape and four reflecting surfaces (320A, 320B, 320C, and 320D). The polygon mirror 301 in FIG. 3 may be referred to as a square mirror, a cube mirror, or a four-sided polygon mirror. In FIG. 3, the polygon mirror 301 may have a shape similar to a cube, cuboid, or rectangular prism. Additionally, the polygon mirror 301 may have a total of six sides, where four of the sides include faces with reflective surfaces (320A, 320B, 320C, and 320D).

In particular embodiments, a polygon mirror 301 may be continuously rotated in a clockwise or counter-clockwise rotation direction about a rotation axis of the polygon mirror 301. The rotation axis may correspond to a line that is perpendicular to the plane of rotation of the polygon mirror 301 and that passes through the center of mass of the polygon mirror 301. In FIG. 3, the polygon mirror 301 rotates in the plane of the drawing, and the rotation axis of the polygon mirror 301 is perpendicular to the plane of the drawing. An electric motor may be configured to rotate a polygon mirror 301 at a substantially fixed frequency (e.g., a rotational frequency of approximately 1 Hz (or 1 revolution per second), 10 Hz, 50 Hz, 100 Hz, 500 Hz, or 1,000 Hz). As an example, a polygon mirror 301 may be mechanically coupled to an electric motor (e.g., a synchronous electric motor) which is configured to spin the polygon mirror 301 at a rotational speed of approximately 160 Hz (or, 9600 revolutions per minute (RPM)).

In particular embodiments, output beam 125 may be reflected sequentially from the reflective surfaces 320A, 320B, 320C, and 320D as the polygon mirror 301 is rotated. This results in the output beam 125 being scanned along a particular scan axis (e.g., a horizontal or vertical scan axis) to produce a sequence of scan lines, where each scan line corresponds to a reflection of the output beam 125 from one of the reflective surfaces of the polygon mirror 301. In FIG. 3, the output beam 125 reflects off of reflective surface 320A to produce one scan line. Then, as the polygon mirror 301 rotates, the output beam 125 reflects off of reflective surfaces 320B, 320C, and 320D to produce a second, third, and fourth respective scan line. In particular embodiments, a lidar system 100 may be configured so that the output beam 125 is first reflected from polygon mirror 301 and then from scan mirror 302 (or vice versa). As an example, an output beam 125 from light source 110 may first be directed to polygon mirror 301, where it is reflected by a reflective surface of the polygon mirror 301, and then the output beam 125 may be directed to scan mirror 302, where it is reflected by reflective surface 321 of the scan mirror 302. In the example of FIG. 3, the output beam 125 is reflected from the polygon mirror 301 and the scan mirror 302 in the reverse order. In FIG. 3, the output beam 125 from light source 110 is first directed to the scan mirror 302, where it is reflected by reflective surface 321, and then the output beam 125 is directed to the polygon mirror 301, where it is reflected by reflective surface 320A.

Figure 4:
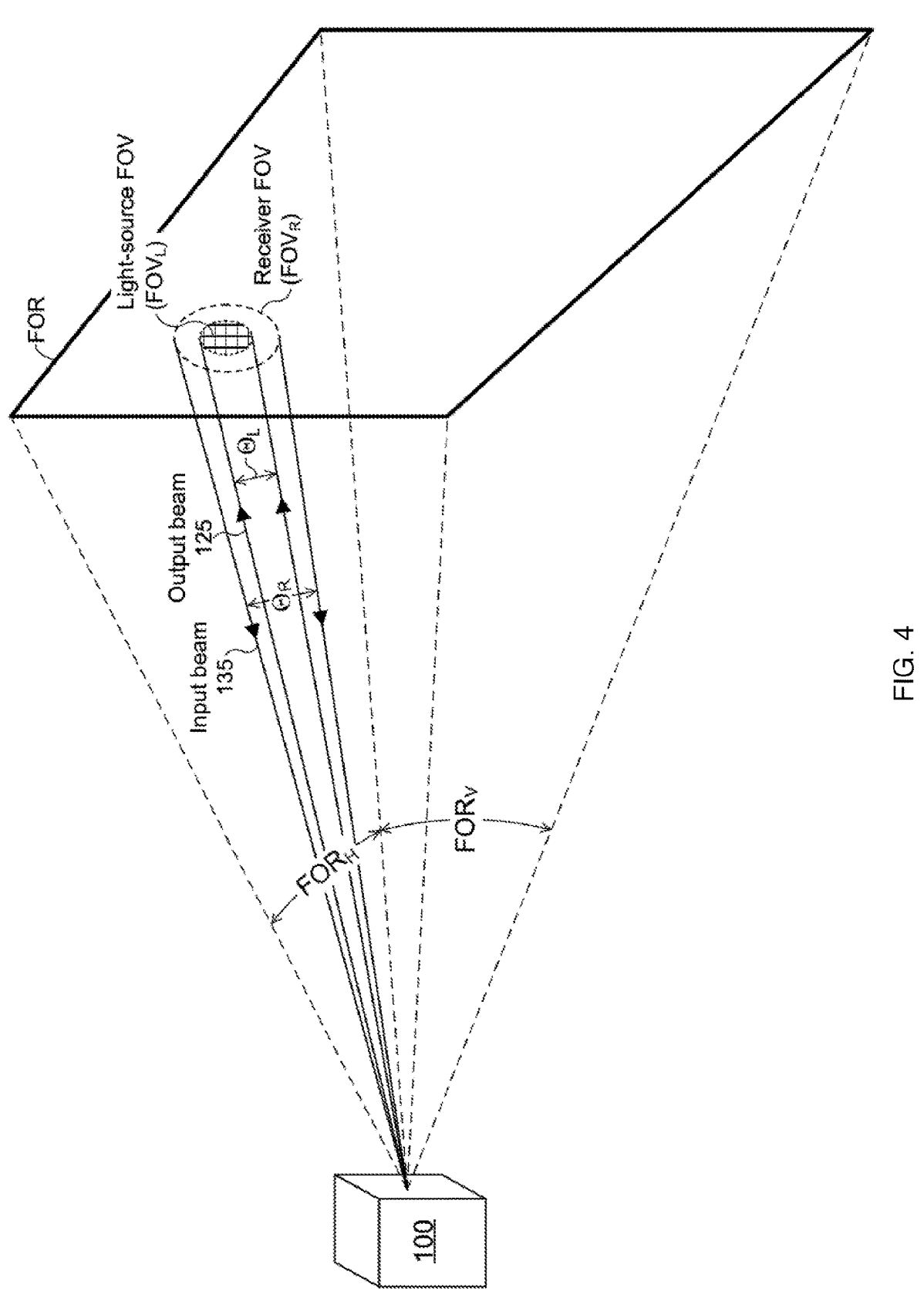
FIG. 4 illustrates an example light-source field of view (FOVL) and receiver field of view (FOVR) for a lidar system.

FIG. 4 illustrates an example light-source field of view (FOV$_L$) and receiver field of view (FOV$_R$) for a lidar system 100. A light source 110 of lidar system 100 may emit pulses of light as the FOV$_L$ and FOV$_R$ are scanned by scanner 120 across a field of regard (FOR). In particular embodiments, a light-source field of view may refer to an angular cone illuminated by the light source 110 at a particular instant of time. Similarly, a receiver field of view may refer to an angular cone over which the receiver 140 may receive or detect light at a particular instant of time, and any light outside the receiver field of view may not be received or detected. As an example, as the light-source field of view is scanned across a field of regard, a portion of a pulse of light emitted by the light source 110 may be sent downrange from lidar system 100, and the pulse of light may be sent in the direction that the $FOV_L$ is pointing at the time the pulse is emitted. The pulse of light may scatter off a target 130, and the receiver 140 may receive and detect a portion of the scattered light that is directed along or contained within the $FOV_R$.

In particular embodiments, scanner 120 may be configured to scan both a light-source field of view and a receiver field of view across a field of regard of the lidar system 100. Multiple pulses of light may be emitted and detected as the scanner 120 scans the $FOV_L$ and $FOV_R$ across the field of regard of the lidar system 100 while tracing out a scan pattern 200. In particular embodiments, the light-source field of view and the receiver field of view may be scanned synchronously with respect to one another, so that as the $FOV_L$ is scanned across a scan pattern 200, the $FOV_R$ follows substantially the same path at the same scanning speed. Additionally, the $FOV_L$ and $FOV_R$ may maintain the same relative position to one another as they are scanned across the field of regard. As an example, the $FOV_L$ may be substantially overlapped with or centered inside the $FOV_R$ (as illustrated in FIG. 4), and this relative positioning between $FOV_L$ and $FOV_R$ may be maintained throughout a scan. As another example, the $FOV_R$ may lag behind the $FOV_L$ by a particular, fixed amount throughout a scan (e.g., the $FOV_R$ may be offset from the $FOV_L$ in a direction opposite the scan direction).

In particular embodiments, the $FOV_L$ may have an angular size or extent $\Theta_L$ that is substantially the same as or that corresponds to the divergence of the output beam 125, and the $FOV_R$ may have an angular size or extent $\Theta_R$ that corresponds to an angle over which the receiver 140 may receive and detect light. In particular embodiments, the receiver field of view may be any suitable size relative to the light-source field of view. As an example, the receiver field of view may be smaller than, substantially the same size as, or larger than the angular extent of the light-source field of view. In particular embodiments, the light-source field of view may have an angular extent of less than or equal to 50 milliradians, and the receiver field of view may have an angular extent of less than or equal to 50 milliradians. The $FOV_L$ may have any suitable angular extent $\Theta_L$, such as for example, approximately 0.1 mrad, 0.2 mrad, 0.5 mrad, 1 mrad, 1.5 mrad, 2 mrad, 3 mrad, 5 mrad, 10 mrad, 20 mrad, 40 mrad, or 50 mrad. Similarly, the $FOV_R$ may have any suitable angular extent $\Theta_R$, such as for example, approximately 0.1 mrad, 0.2 mrad, 0.5 mrad, 1 mrad, 1.5 mrad, 2 mrad, 3 mrad, 5 mrad, 10 mrad, 20 mrad, 40 mrad, or 50 mrad. In particular embodiments, the light-source field of view and the receiver field of view may have approximately equal angular extents. As an example, $\Theta_L$ and $\Theta_R$ may both be approximately equal to 1 mrad, 2 mrad, or 4 mrad. In particular embodiments, the receiver field of view may be larger than the light-source field of view, or the light-source field of view may be larger than the receiver field of view. As an example, $\Theta_L$ may be approximately equal to 3 mrad, and $\Theta_R$ may be approximately equal to 4 mrad. As another example, $\Theta_R$ may be approximately K times larger than $\Theta_L$, where K is any suitable factor, such as for example, 1.1, 1.2, 1.5, 2, 3, 5, or 10.

In particular embodiments, a pixel 210 may represent or may correspond to a light-source field of view or a receiver field of view. As the output beam 125 propagates from the light source 110, the diameter of the output beam 125 (as well as the size of the corresponding pixel 210) may increase according to the beam divergence OL. As an example, if the output beam 125 has a $\Theta_L$ of 2 mrad, then at a distance of 100 m from the lidar system 100, the output beam 125 may have a size or diameter of approximately 20 cm, and a corresponding pixel 210 may also have a corresponding size or diameter of approximately 20 cm. At a distance of 200 m from the lidar system 100, the output beam 125 and the corresponding pixel 210 may each have a diameter of approximately 40 cm.

Figure 5:
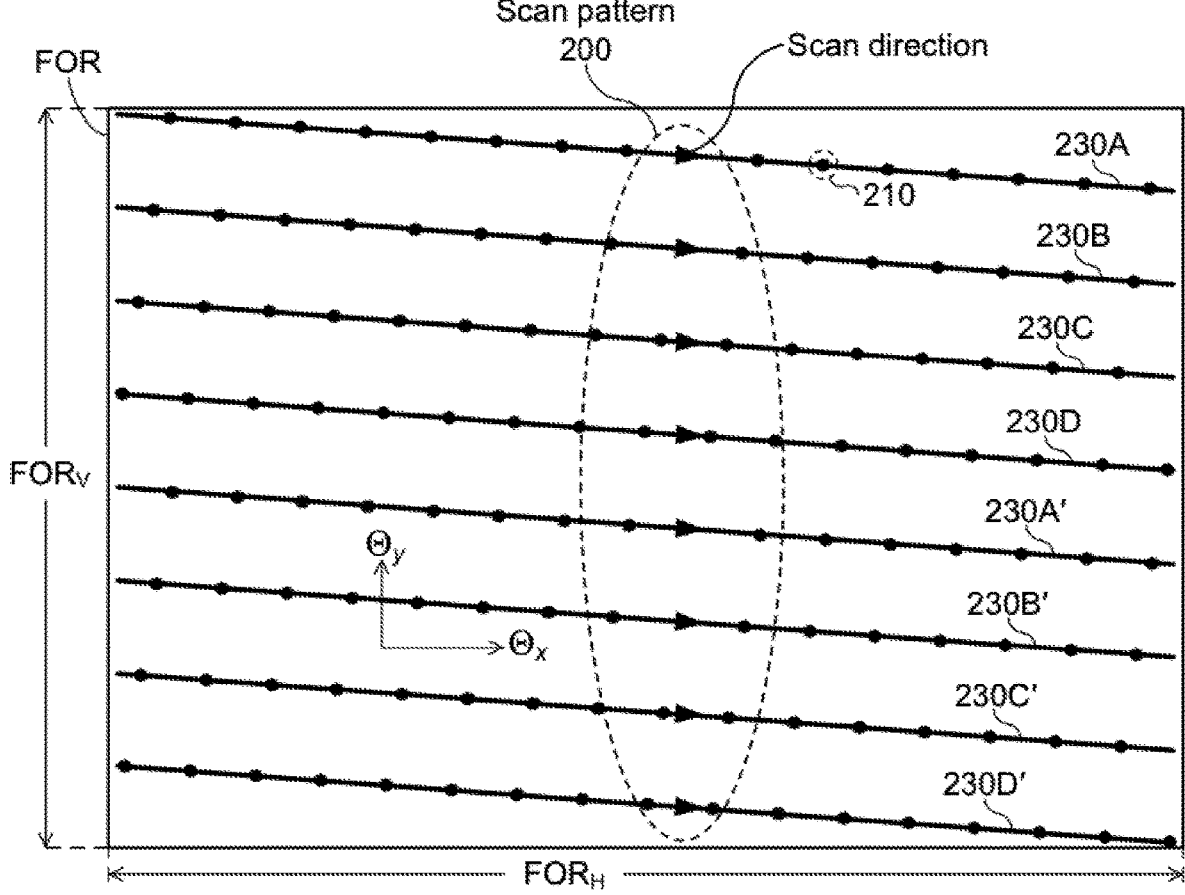
FIG. 5 illustrates an example unidirectional scan pattern that includes multiple pixels and multiple scan lines.

FIG. 5 illustrates an example unidirectional scan pattern 200 that includes multiple pixels 210 and multiple scan lines 230. In particular embodiments, scan pattern 200 may include any suitable number of scan lines 230 (e.g., approximately 1, 2, 5, 10, 20, 50, 100, 500, or 1,000 scan lines), and each scan line 230 of a scan pattern 200 may include any suitable number of pixels 210 (e.g., 1, 2, 5, 10, 20, 50, 100, 200, 500, 1,000, 2,000, or 5,000 pixels). The scan pattern 200 illustrated in FIG. 5 includes eight scan lines 230, and each scan line 230 includes approximately 16 pixels 210. In particular embodiments, a scan pattern 200 where the scan lines 230 are scanned in two directions (e.g., alternately scanning from right to left and then from left to right) may be referred to as a bidirectional scan pattern 200, and a scan pattern 200 where the scan lines 230 are scanned in the same direction may be referred to as a unidirectional scan pattern 200. The scan pattern 200 in FIG. 2 may be referred to as a bidirectional scan pattern, and the scan pattern 200 in FIG. 5 may be referred to as a unidirectional scan pattern 200 where each scan line 230 travels across the FOR in substantially the same direction (e.g., approximately from left to right as viewed from the lidar system 100). In particular embodiments, scan lines 230 of a unidirectional scan pattern 200 may be directed across a FOR in any suitable direction, such as for example, from left to right, from right to left, from top to bottom, from bottom to top, or at any suitable angle (e.g., at a 0°, 5°, 10°, 30°, or 45° angle) with respect to a horizontal or vertical axis. In particular embodiments, each scan line 230 in a unidirectional scan pattern 200 may be a separate line that is not directly connected to a previous or subsequent scan line 230.

In particular embodiments, a unidirectional scan pattern 200 may be produced by a scanner 120 that includes a polygon mirror (e.g., polygon mirror 301 of FIG. 3), where each scan line 230 is associated with a particular reflective surface 320 of the polygon mirror. As an example, reflective surface 320A of polygon mirror 301 in FIG. 3 may produce scan line 230A in FIG. 5. Similarly, as the polygon mirror 301 rotates, reflective surfaces 320B, 320C, and 320D may successively produce scan lines 230B, 230C, and 230D, respectively. Additionally, for a subsequent revolution of the polygon mirror 301, the scan lines 230A', 230B', 230C', and 230D' may be successively produced by reflections of the output beam 125 from reflective surfaces 320A, 320B, 320C, and 320D, respectively. In particular embodiments, N successive scan lines 230 of a unidirectional scan pattern 200 may correspond to one full revolution of an N-sided polygon mirror. As an example, the four scan lines 230A, 230B, 230C, and 230D in FIG. 5 may correspond to one full revolution of the four-sided polygon mirror 301 in FIG. 3.

Additionally, a subsequent revolution of the polygon mirror 301 may produce the next four scan lines 230A', 230B', 230C', and 230D' in FIG. 5.

Figure 6:
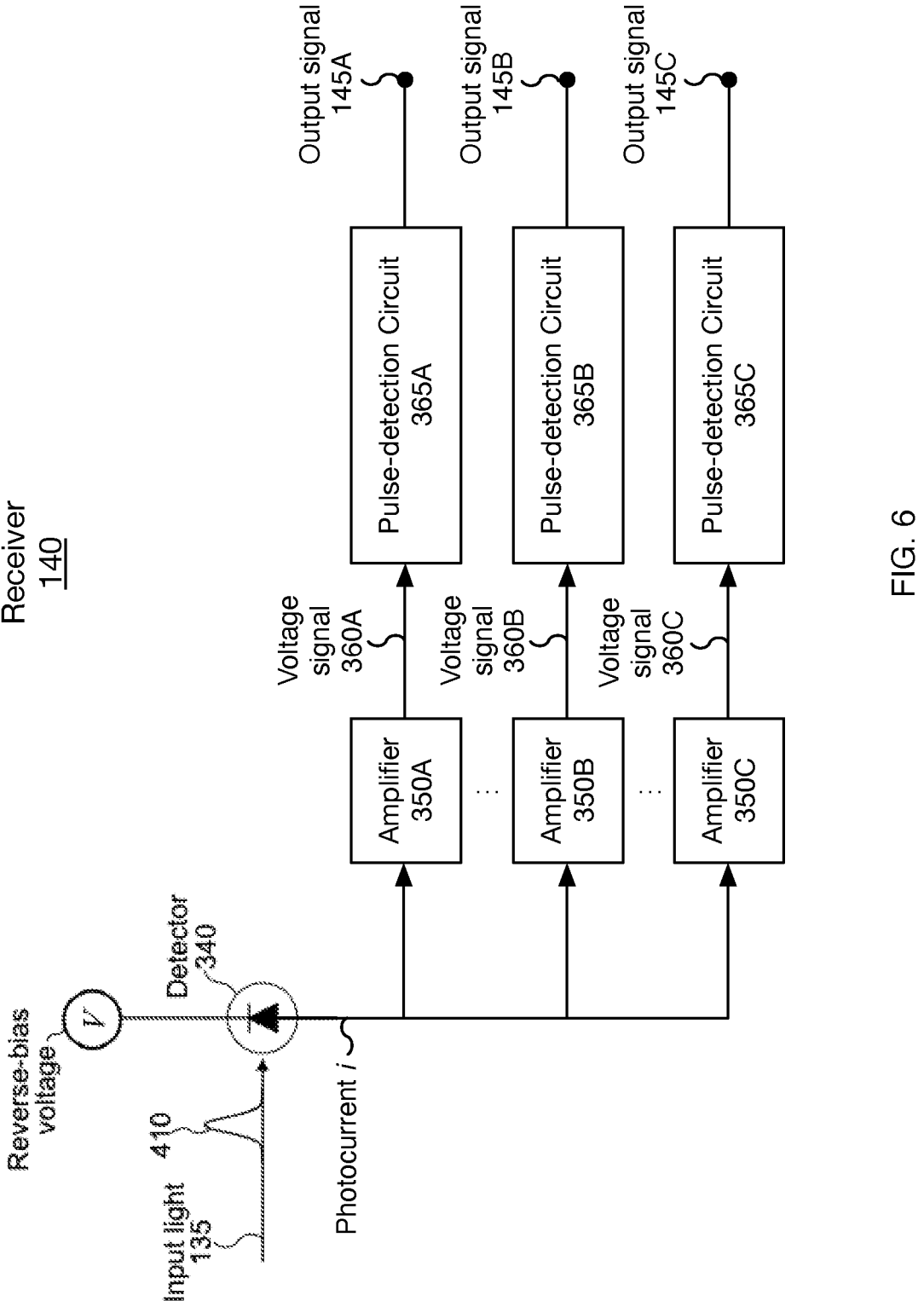
FIG. 6 illustrates an example multi-channel receiver that includes a detector coupled to multiple pulse-detection circuits.

FIG. 6 illustrates an example multi-channel receiver 140 that includes a detector 340 coupled to multiple pulse-detection circuits 365A-C. In the example shown, multi-channel receiver 140 includes multiple amplifiers 350A-C and corresponding pulse-detection circuits 365A-C to output multiple output signals 145A-C. Each of amplifiers 350A-C can be configured with a different gain, such as a superlow, low, medium, or high gain, to output different corresponding voltage signals 360A-C, respectively. In the example shown, multi-channel receiver 140 is configured with three channels, corresponding to output signals 145A-C, however, a configuration with a different number of channels is appropriate as well. In some embodiments, receiver 140 of FIG. 6 is receiver 140 of FIGS. 1 and/or 3 of a lidar system. In some embodiments, the lidar system is lidar system 100 of FIGS. 1-4.

In the example shown, receiver 140 of FIG. 6 includes a detector 340, amplifiers 350A-C, and pulse-detection circuits 365A-C. The amplifiers 350A-C and pulse-detection circuits 365A-C may correspond to three different channels as denoted by the letter suffixes A, B, and C of amplifiers 350A-C and pulse-detection circuits 365A-C. The amplifiers 350A-C and pulse-detection circuits 365A-C may include circuitry that receives an electrical-current signal (e.g., photocurrent i) from a detector 340 and performs current-to-voltage conversion, signal amplification, sampling, filtering, signal conditioning, analog-to-digital conversion, time-to-digital conversion, pulse detection, threshold detection, rising-edge detection, falling-edge detection, or pulse time-of-arrival determination. Electronic amplifiers 350A-C may each include one or more transimpedance amplifiers (TIAs) or one or more voltage-gain circuits (not shown), and pulse-detection circuits 365A-C may each include one or more comparators or one or more time-to-digital converters (TDCs) (not shown). In some embodiments, pulse-detection circuits 365A-C may be used to determine (i) whether an optical signal (e.g., an optical pulse) has been received by a detector 340, (ii) a time associated with receipt of an optical signal by a detector 340, and/or (iii) another measurement value associated with the optical signal. The output signals 145A-C from corresponding pulse-detection circuits 365A-C may be sent to a controller 150 (as shown in FIG. 1), and based on the output signals 145A-C, in particular embodiments, the controller 150 may determine (i) whether an optical signal (e.g., a pulse of light 410) has been received by a detector 340, (ii) a time associated with receipt of an optical signal by a detector 340 (e.g., a time of arrival of a received pulse of light 410), and/or (iii) another measurement value associated with the optical signal. Although single instances of many components are shown in and described with respect to FIG. 6, for example receiver 140, in various embodiments, receiver 140 can include multiple instances of the components shown in FIG. 6, such as multiple instances of detector 340, amplifiers 350A-C, and/or pulse-detection circuits 365A-C, for example, to detect different light pulses or the occurrence of the same light pulse.

In various embodiments, amplifiers 350A-C and pulse-detection circuits 365A-C are located within a receiver 140, or all or part of amplifiers 350A-C or pulse-detection circuits 365A-C may be located external to the receiver. For example, amplifiers 350A-C may be part of a receiver 140, and pulse-detection circuits 365A-C may be located external to the receiver 140 (e.g., within a controller 150 located external to the receiver 140). As another example, amplifiers 350A-C and pulse-detection circuits 365A-C may be located within a receiver 140, as illustrated in FIG. 6. A controller 150 may be located within a receiver 140, external to the receiver 140, or partially within and partially external to the receiver 140. For example, a controller 150 may be located external to the receiver 140, and output signals 145A-C may be sent (e.g., via a high-speed data link) to the controller 150 for processing or analysis. As another example, a controller 150 may include an ASIC that is located within the receiver 140 (e.g., the ASIC may include one or more of amplifiers 350A-C or pulse-detection circuits 365A-C, as well as additional circuitry configured to receive and process output signals 145A-C from pulse-detection circuits 365A-C). In addition to an ASIC located within the receiver 140, the controller 150 may also include one or more additional processors located external to the receiver 140 or external to the lidar system 100 (e.g., a processor may receive data from an ASIC and process the data to produce point clouds, identify an object located ahead of a vehicle, or provide control signals to a vehicle's driving systems).

In FIG. 6, the detector 340 receives input light 135 and produces a photocurrent i that is sent to amplifiers 350A-C. The photocurrent i produced by the detector 340 in response to the input light 135 may be referred to as a photocurrent signal, electrical-current signal, electrical current, detector current, or current. The detector 340 may be a PN photodiode, a PIN photodiode, an APD, a SPAD, or any other suitable detector. The detector 340 may have an active region or an avalanche-multiplication region that includes indium gallium arsenide (InGaAs), germanium (Ge), silicon (Si), germanium silicon (GeSi), germanium silicon tin (GeSiSn), or any other suitable detector material. The detector 340 may be configured to detect light at one or more operating wavelengths of a lidar system 100, such as for example at a wavelength of approximately 905 nm, 1200 nm, 1400 nm, 1500 nm, or 1550 nm, or at one or more wavelengths in the 1400-1600 nm range. For example, a light source 110 may produce an output beam 125 having a wavelength of approximately 905 nm, and the detector 340 may be a silicon photodetector that detects 905 nm light. As another example, a light source 110 may emit light at one or more wavelengths from 1400 nm to 1600 nm, and the detector 340 may be a InGaAs APD that detects light in the 1400-1600 nm range. A receiver 140 may include a detector 340 with a single detector element (as illustrated in FIG. 6), or a receiver 140 may include a one-dimensional or two-dimensional detector array with multiple detector elements.

The receiver 140 in FIG. 6 includes a detector 340 coupled to electronic amplifiers 350A-C, which in turn, are coupled to a corresponding pulse-detection circuits 365A-C, respectively. The detector 340 may also be coupled to a voltage source that supplies a reverse-bias voltage V to the detector 340, as illustrated in FIG. 6. The detector 340 receives input light 135 and produces a photocurrent i that is sent to amplifiers 350A-C, and amplifiers 350A-C produce corresponding voltage signals 360A-C that are sent to corresponding pulse-detection circuits 365A-C. In the example of FIG. 6, the input light 135 includes a received pulse of light 410 (which may include a portion of a pulse of light emitted by a light source 110 and scattered by a remote target 130). The photocurrent signal i may include a pulse of electrical current that corresponds to the received pulse of light 410. The pulse of current and the pulse of light 410 corresponding to one another may refer to the pulse of current and the pulse of light 410 having similar pulse characteristics (e.g., similar rise times, fall times, shapes, or durations). For example, the pulse of electrical current may have a rise time, fall time, or duration that is approximately equal to or somewhat greater than that of the pulse of light 410 (e.g., a rise time, fall time, or duration between 1× and 1.5× that of the pulse of light 410). The electrical current may have a somewhat longer rise time, fall time, or duration due to a limited electrical bandwidth of the detector 340 or the detector circuitry. As another example, the pulse of light 410 may have a 1-ns rise time and a 4-ns duration, and the pulse of electrical current may have a 1.2-ns rise time and a 5-ns duration.

In particular embodiments, amplifiers 350A-C may each include a TIA configured to receive a photocurrent signal i from a detector 340 and produce voltage signals 360A-C, respectively, that correspond to the received photocurrent. As an example, in response to a received optical pulse (e.g., light from an emitted optical pulse that is scattered by a remote target 130), a detector 340 may produce photocurrent i that includes a pulse of electrical current corresponding to the received optical pulse. Each of amplifiers 350A-C may receive the electrical-current pulse from the detector 340 and produce a voltage pulse that corresponds to the received current pulse. In particular embodiments, each of amplifiers 350A-C may also act as an electronic filter. As an example, one or more of amplifiers 350A-C may be configured, for example, by utilizing a TIA, as a low-pass filter that removes or attenuates high-frequency electrical noise by attenuating signals above a particular frequency (e.g., above 1 MHz, 10 MHZ, 20 MHz, 50 MHz, 100 MHZ, 200 MHZ, 300 MHz, 1 GHZ, or any other suitable frequency). In particular embodiments, one or more of amplifiers 350A-C may include a voltage-gain circuit (which may be referred to as a gain circuit or a voltage amplifier) configured to amplify a voltage signal. As an example, a gain circuit of one of amplifiers 350A-C may include one or more voltage-amplification stages that amplify a voltage signal received from a TIA of one of amplifiers 350A-C. For example, a gain circuit may receive a voltage pulse from a TIA of one of amplifiers 350A-C, and the gain circuit may amplify the voltage pulse by any suitable amount, such as for example, by a gain of approximately 3 dB, 10 dB, 20 dB, 30 dB, 40 dB, or 50 dB. Additionally, the gain circuit may be configured to also act as an electronic filter to remove or attenuate electrical noise. In various embodiments, each of amplifiers 350A-C is configured differently to produce different voltage signals 360A-C, respectively. In particular embodiments, one or more of amplifiers 350A-C may not include a separate gain circuit (e.g., a TIA may produce a voltage signal such as one of voltage signals 360A-C that is directly coupled to a comparator of pulse-detection circuits 365A-C without an intervening gain circuit).

In particular embodiments, pulse-detection circuits 365A-C may each include a comparator configured to receive voltage signals 360A-C, respectively, from corresponding amplifiers 350A-C and produce an electrical-edge signal (e.g., a rising edge or a falling edge) when the received voltage signal rises above or falls below a particular threshold voltage $V_T$. As an example, when one of received voltage signals 360A-C rises above $V_T$, a comparator of the corresponding pulse-detection circuit may produce a rising-edge digital-voltage signal (e.g., a signal that steps from approximately 0 V to approximately 2.5 V, 3.3 V, 5 V, or any other suitable digital-high level). Additionally or alternatively, when one of received voltage signals 360A-C falls below $V_T$, a comparator of the corresponding pulse-detection circuit may produce a falling-edge digital-voltage signal (e.g., a signal that steps down from approximately 2.5

V, 3.3 V, 5 V, or any other suitable digital-high level to approximately 0 V). The voltage signals 360A-C received by the comparators of pulse-detection circuits 365A-C may each be received from a TIA or gain circuit of corresponding amplifiers 350A-C and may correspond to a photocurrent signal i produced by a detector 340. As an example, the voltage signal 360A received by pulse-detection circuit 365A may include a voltage pulse that corresponds to an electrical-current pulse produced by the detector 340 in response to a received optical pulse. The voltage signal 360A received by pulse-detection circuit 365A may be an analog signal, and an electrical-edge signal produced by the pulse-detection circuit 365A may be a digital signal. In some embodiments, the threshold voltage $V_T$ of pulse-detection circuits 365A-C may be configured differently. In various embodiments, the electrical-edge signals produced by the pulse-detection circuits 365A-C correspond to output signals 145A-C, respectively.

In particular embodiments, pulse-detection circuits 365A-C may each include a time-to-digital converter (TDC) configured to receive an electrical-edge signal from a comparator and determine an interval of time between emission of a pulse of light by the light source 110 and receipt of the electrical-edge signal. The interval of time may correspond to a round-trip time of flight for an emitted pulse of light to travel from the lidar system 100 to a target 130 and back to the lidar system 100. The portion of the emitted pulse of light that is received by the lidar system 100 (e.g., scattered light from target 130) may be referred to as a received pulse of light. The output of the TDC may include one or more numerical values, where each numerical value (which may be referred to as a numerical time value, a time value, a digital value, or a digital time value) corresponds to a time interval determined by the TDC. In particular embodiments, a TDC may have an internal counter or clock with any suitable period, such as for example, 5 ps, 10 ps, 15 ps, 20 ps, 30 ps, 50 ps, 100 ps, 0.5 ns, 1 ns, 2 ns, 5 ns, or 10 ns. As an example, the TDC may have an internal counter or clock with a 20-ps period, and the TDC may determine that an interval of time between emission and receipt of an optical pulse is equal to 25,000 time periods, which corresponds to a time interval of approximately 0.5 microseconds. The TDC may send an output signal that includes the numerical value "25000" to a processor or controller 150 of the lidar system 100. In particular embodiments, a lidar system 100 may include a processor configured to determine a distance from the lidar system 100 to a target 130 based at least in part on an interval of time determined by a TDC. As an example, the processor may be an ASIC or FPGA and may be a part of a receiver 140 or controller 150. The processor may receive a numerical value (e.g., "25000") from the TDC, and based on the received value, the processor may determine the distance from the lidar system 100 to a target 130. Although shown as three separate components, in some embodiments, pulse-detection circuits 365A-C may overlap and/or share sub-components.

In particular embodiments, determining an interval of time between emission and receipt of a pulse of light may be based on determining (1) a time associated with the emission of the pulse by light source 110 or lidar system 100 and (2) a time when scattered light from the pulse is detected by receiver 140. As an example, a TDC of pulse-detection circuits 365A-C may count the number of time periods or clock cycles between an electrical edge associated with emission of a pulse of light and an electrical edge associated with detection of scattered light from the pulse. Determining when scattered light from the pulse is detected by receiver

140 may be based on determining a time for a rising or falling edge (e.g., a rising or falling edge produced by one or more comparators of a pulse-detection circuit) associated with the detected pulse. In particular embodiments, determining a time associated with emission of a pulse of light may be based on an electrical trigger signal. As an example, light source 110 may produce an electrical trigger signal for each pulse of light that is emitted, or an electrical device (e.g., controller 150) may provide a trigger signal to the light source 110 to initiate the emission of each pulse of light. A trigger signal associated with emission of an optical pulse may be provided to TDC, and a rising edge or falling edge of the trigger signal may correspond to a time when the optical pulse is emitted. In particular embodiments, a time associated with emission of an optical pulse may be determined based on an optical trigger signal. As an example, a time associated with the emission of a pulse of light may be determined based at least in part on detection of a portion of light from the emitted pulse of light prior to the emitted pulse of light exiting the lidar system 100 and propagating to target 130. The portion of the emitted pulse of light (which may be referred to as an optical trigger pulse) may be detected by a separate detector (e.g., a PIN photodiode or an APD) or by the receiver 140. A portion of light from an emitted pulse of light may be scattered or reflected from a surface (e.g., a surface of a beam splitter or window, or a surface of light source 110, mirror 115, or scanner 120) located within lidar system 100. Some of the scattered or reflected light may be received by a detector 340 of receiver 140, and components including combinations of amplifiers 350A-C and pulse-detection circuits 365A-C coupled to the detector 340 may determine that an optical trigger pulse has been received. The time at which the optical trigger pulse was received may be associated with the emission time of the pulse. In some embodiments, one or more of output signals 145A-C are fused together with each other and/or other output signals associated with one or more other detectors to determine a fused output signal potentially having greater dynamic range and accuracy.

Figure 7:
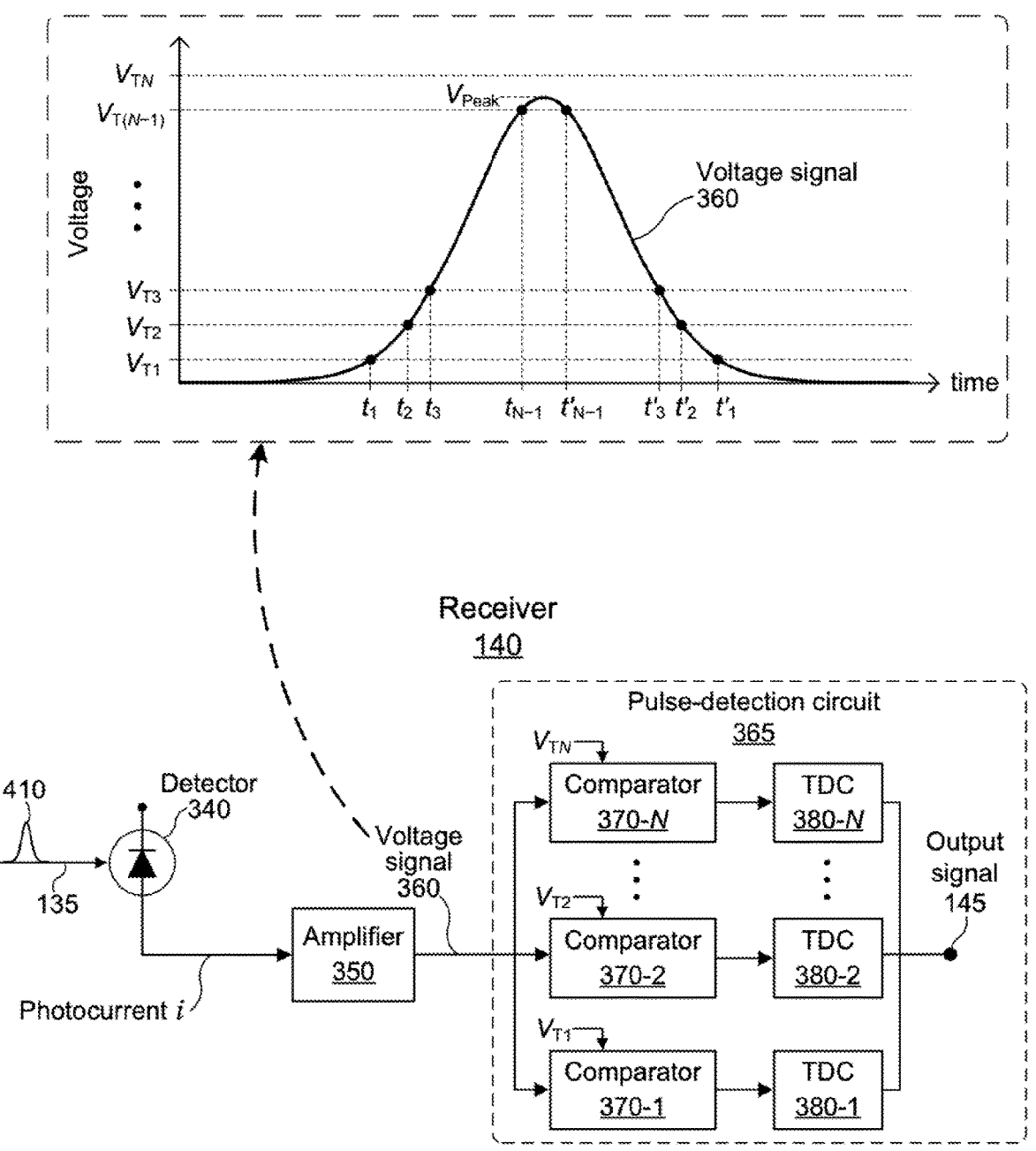
FIG. 7 illustrates an example receiver and an example voltage signal corresponding to a received pulse of light.

FIG. 7 illustrates an example receiver 140 and an example voltage signal 360 corresponding to a received pulse of light 410. A light source 110 of a lidar system 100 may emit a pulse of light, and a receiver 140 may be configured to detect input light 135. The input light 135 in FIG. 7 may include a received pulse of light 410. In particular embodiments, a receiver 140 of a lidar system 100 may include one or more detectors 340, one or more electronic amplifiers 350, or one or more pulse-detection circuits 365 each with one or more comparators 370 and/or one or more time-to-digital converters (TDCs) 380. The receiver 140 illustrated in FIG. 7 includes a detector 340 configured to receive input light 135 and produce a photocurrent i that corresponds to a received pulse of light 410 (which is part of the input light 135). The photocurrent i produced by the detector 340 may be referred to as a photocurrent signal, electrical-current signal, electrical current, or current. The detector 340 may be a PN photodiode, a PIN photodiode, an APD, a SPAD, or any other suitable detector. The detector 340 may be configured to detect light at a 1200-1600 nm operating wavelength of a lidar system 100. Although receiver 140 of FIG. 7 is shown with a single amplifier 350 and a single pulse-detection circuit 365 to output a single output signal 145, in various embodiments, receiver 140 can include additional components as shown in FIG. 6 to output multiple output signals, each corresponding to a different channel. In various embodiments, receiver 140 of FIG. 7 is receiver 140 of lidar system 100 of FIGS. 1-4 and/or receiver 140 of FIGS. 1, 3 and/or 6.

In FIG. 7, the detector 340 is electrically coupled to amplifier 350 and pulse-detection circuit 365 (which may be together referred to as a signal-detection circuit). The detector 340 is also electrically coupled to a voltage source that supplies a reverse-bias voltage V to the detector 340. The signal-detection circuit includes an electronic amplifier 350 configured to receive the photocurrent i and produce a voltage signal 360 that corresponds to the received photocurrent. For example, the detector 340 may produce a pulse of photocurrent in response to a received pulse of light 410, and the voltage signal 360 may be an analog voltage pulse that corresponds to the pulse of photocurrent. The amplifier 350 may include a TIA configured to receive the photocurrent i and amplify the photocurrent to produce a voltage signal 360 (e.g., a voltage pulse) that corresponds to the photocurrent signal. Alternatively, the amplifier 350 may include a TIA followed by a voltage-gain circuit. The TIA may amplify the photocurrent i to produce an intermediate voltage signal (e.g., a voltage pulse), and the voltage-gain circuit may amplify the intermediate voltage signal to produce a voltage signal 360 (e.g., an amplified voltage pulse). An amplifier or a TIA may include an electronic filter (e.g., a low-pass, high-pass, or band-pass filter) that filters the photocurrent i or the voltage signal 360. The transimpedance gain or amplification of a TIA may be expressed in units of ohms ($\Omega$), or equivalently volts per ampere (V/A). For example, if a TIA has a gain of 100 V/A, then for a photocurrent i with a peak current of 10 $\mu$A, the TIA may produce a voltage signal 360 with a corresponding peak voltage of approximately 1 mV.

In FIG. 7, the voltage signal 360 produced by the amplifier 350 is coupled to N comparators (comparators 370-1, 370-2, . . . , 370-N), and each comparator is supplied with a particular threshold or reference voltage ($V_{T1}$, $V_{T2}$, . . . , $V_{TN}$). A pulse-detection circuit 365 may include 1, 2, 5, 10, 50, 100, 500, 1000, or any other suitable number of comparators 370. In FIG. 7, the pulse-detection circuit 365 may include N=10 comparators, and the threshold voltages may be set to 10 values between 0 volts and 1 volt (e.g., $V_{T1}$=0.1 V, $V_{T2}$=0.2 V, and $V_{T10}$=1.0 V). Each comparator may produce an electrical-edge signal (e.g., a rising or falling electrical edge) when the voltage signal 360 rises above or falls below a particular threshold voltage. For example, comparator 370-2 may produce a rising edge when the voltage signal 360 rises above the threshold voltage $V_{T2}$. Additionally or alternatively, comparator 370-2 may produce a falling edge when the voltage signal 360 falls below the threshold voltage $V_{T2}$.

The pulse-detection circuit 365 in FIG. 7 includes N time-to-digital converters (TDCs 380-1, 380-2, . . . , 380-N), and each comparator is coupled to a TDC 380. Each comparator-TDC pair in FIG. 7 (e.g., comparator 370-1 and TDC 380-1) may be referred to as a threshold detector. A comparator may provide an electrical-edge signal to a corresponding TDC, and the TDC may act as a timer that produces an electrical output signal (e.g., a digital signal, a digital word, or a digital value) that represents a time when the edge signal is received from the comparator. For example, if the voltage signal 360 rises above the threshold voltage $V_{T1}$, then the comparator 370-1 may produce a rising-edge signal that is supplied to the input of TDC 380-1, and the TDC 380-1 may produce a digital time value corresponding to a time when the edge signal was received by TDC 380-1. The digital time value may be referenced to the time when a pulse of light is emitted by a light source 110, and the digital time value may correspond to or may be used to determine a round-trip time for the pulse of light to travel from a lidar system 100, to a target 130, and back to the lidar system 100. Additionally, if the voltage signal 360 subsequently falls below the threshold voltage $V_{T1}$, then the comparator 370-1 may produce a falling-edge signal that is supplied to the input of TDC 380-1, and TDC 380-1 may produce a digital time value corresponding to a time when the edge signal was received by TDC 380-1.

In particular embodiments, an output signal 145 of a pulse-detection circuit 365 may include an electrical signal that corresponds to a received pulse of light 410. For example, the pulse-detection output signal 145 in FIG. 7 may be a digital signal that corresponds to the analog voltage signal 360, which in turn corresponds to the photocurrent signal i, which in turn corresponds to a received pulse of light 410. If an input light signal 135 includes a received pulse of light 410, the pulse-detection circuit 365 may receive a photocurrent i (e.g., a pulse of current) and produce an output signal 145 that corresponds to the received pulse of light 410. The output signal 145 may include one or more digital time values from each of the TDCs 380 that received one or more edge signals from a comparator 370, and the digital time values may represent the analog voltage signal 360. The output signal 145 from a pulse-detection circuit 365 may be sent to a controller 150, and a time of arrival for the received pulse of light 410 (which may be referred to as a time of receipt) may be determined based at least in part on the one or more time values produced by the TDCs. For example, the time of arrival may be determined from a time associated with a peak (e.g., $V_{peak}$) of the voltage signal 360 or from a temporal center (e.g., a centroid or weighted average) of the voltage signal 360. The output signal in FIG. 7 may correspond to the electrical output signal 145 in FIG. 1.

In particular embodiments, a pulse-detection output signal 145 may include one or more digital values that correspond to a time interval between (1) a time when a pulse of light is emitted and (2) a time when a received pulse of light 410 is detected by a receiver 140. The output signal 145 in FIG. 7 may include digital values from each of the TDCs that receive an edge signal from a comparator, and each digital value may represent a time interval between the emission of an optical pulse by a light source 110 and the receipt of an edge signal from a comparator. For example, a light source 110 may emit a pulse of light that is scattered by a target 130, and a receiver 140 may receive a portion of the scattered pulse of light as an input pulse of light. When the light source emits the pulse of light, a count value of the TDCs may be reset to zero counts. Alternatively, the TDCs in receiver 140 may accumulate counts continuously over multiple pulse periods (e.g., for 10, 100, 1,000, 10,000, or 100,000 pulse periods), and when a pulse of light is emitted, a TDC count associated with the pulse emission may be stored in memory. After the pulse of light is emitted, the TDCs may continue to accumulate counts that correspond to elapsed time (e.g., the TDCs may count in terms of clock cycles or some fraction of clock cycles).

In FIG. 7, when TDC 380-1 receives an edge signal from comparator 370-1, the TDC 380-1 may produce a digital signal that represents the time interval between emission of the pulse of light and receipt of the edge signal. For example, the digital signal may include a digital value that corresponds to the number of clock cycles that elapsed between emission of the pulse of light and receipt of the edge signal. Alternatively, if the TDC 380-1 accumulates counts over multiple pulse periods, then the digital signal may include a digital value that corresponds to the TDC count at the time of receipt of the edge signal. The pulse-detection output signal 145 may include digital values corresponding to one or more times when a pulse of light was emitted and one or more times when a TDC received an edge signal. An output signal 145 from pulse-detection circuit 365 may correspond to a received pulse of light 410 and may include digital values from each of the TDCs that receive an edge signal from a comparator. The output signal 145 may be sent to a controller 150, and the controller may determine a distance D to the target 130 based at least in part on the output signal 145. Additionally or alternatively, the controller 150 may determine an optical characteristic of a received pulse of light 410 based at least in part on the output signal 145 received from the TDCs of a pulse-detection circuit 365.

In particular embodiments, a receiver 140 of a lidar system 100 may include one or more analog-to-digital converters (ADCs). As an example, instead of including multiple comparators and TDCs, a receiver 140 may include an ADC that receives a voltage signal 360 from amplifier 350 and produces a digital representation of the voltage signal 360. Although this disclosure describes or illustrates example receivers 140 that include one or more comparators 370 and one or more TDCs 380, a receiver 140 may additionally or alternatively include one or more ADCs. As an example, in FIG. 7, instead of the N comparators 370 and N TDCs 380, the receiver 140 may include an ADC configured to receive the voltage signal 360 and produce a digital output signal 145 that includes digitized values that correspond to the voltage signal 360.

The example voltage signal 360 illustrated in FIG. 7 corresponds to a received pulse of light 410. The voltage signal 360 may be an analog signal produced by an electronic amplifier 350 and may correspond to a pulse of light detected by the receiver 140 in FIG. 7. The voltage levels on the y-axis correspond to the threshold voltages $V_{T1}$, $V_{T2}$, . . . , $V_{TN}$ of the respective comparators 370-1, 370-2, . . . , 370-N. The time values $t_1$, $t_2$, $t_3$, . . . , $t_{N-1}$ correspond to times when the voltage signal 360 exceeds the corresponding threshold voltages, and the time values $t'_1$, $t'_2$, $t'_3$, . . . , $t'_{N-1}$ correspond to times when the voltage signal 360 falls below the corresponding threshold voltages. For example, at time $t_1$ when the voltage signal 360 exceeds the threshold voltage $V_{T1}$, comparator 370-1 may produce an edge signal, and TDC 380-1 may output a digital value corresponding to the time $t_1$. Additionally, the TDC 380-1 may output a digital value corresponding to the time $t'_1$ when the voltage signal 360 falls below the threshold voltage $V_{T1}$. Alternatively, the receiver 140 may include an additional TDC (not illustrated in FIG. 7) configured to produce a digital value corresponding to time $t'_1$ when the voltage signal 360 falls below the threshold voltage $V_{T1}$. The output signal 145 from pulse-detection circuit 365 may include one or more digital values that correspond to one or more of the time values $t_1$, $t_2$, $t_3$, . . . , $t_{N-1}$ and $t'_1$, $t'_2$, $t'_3$, . . . , $t'_{N-1}$. Additionally, the output signal 145 may also include one or more values corresponding to the threshold voltages associated with the time values. Since the voltage signal 360 in FIG. 7 does not exceed the threshold voltage $V_{TN}$, the corresponding comparator 370-N may not produce an edge signal. As a result, TDC 380-N may not produce a time value, or TDC 380-N may produce a signal indicating that no edge signal was received.

In particular embodiments, an output signal 145 produced by a pulse-detection circuit 365 of a receiver 140 may correspond to or may be used to determine an optical characteristic of a received pulse of light 410 detected by the receiver 140. An optical characteristic of a received pulse of light 410 may include a peak optical intensity, a peak optical power, an average optical power, an optical energy, a shape or amplitude, a time of receipt, a temporal center, a round-trip time of flight, or a temporal duration or width of the received pulse of light 410. One or more of the approaches for determining an optical characteristic of a received pulse of light 410 as described herein may be implemented using a receiver 140 that includes one or more comparators 370 and TDCs 380 or using a receiver 140 that includes one or more ADCs. For example, an optical characteristic of a received pulse of light 410 may be determined from an output signal 145 provided by multiple TDCs 380 of a pulse-detection circuit 365 (as illustrated in FIG. 7), or an optical characteristic may be determined from an output signal 145 provided by one or more ADCs of a pulse-detection circuit.

A round-trip time of flight (e.g., a time for an emitted pulse of light to travel from the lidar system 100 to a target 130 and back to the lidar system 100) may be determined based on a difference between a time of receipt and a time of emission for a pulse of light, and the distance D to the target 130 may be determined based on the round-trip time of flight. A time of receipt for a received pulse of light 410 may correspond to (i) a time associated with a peak of voltage signal 360 or (ii) a time associated with a temporal center of voltage signal 360. For example, in FIG. 7, a time associated with the peak voltage ($V_{peak}$) may be determined based on the threshold voltage $V_{T(N-1)}$ (e.g., an average of the times $t_{N-1}$ and $t'_{N-1}$ may correspond to the peak-voltage time). As another example, a curve-fit or interpolation operation may be applied to the values of a pulse-detection output signal 145 to determine a time associated with the peak voltage. A curve may be fit to the values of a pulse-detection output signal 145 to produce a curve that approximates the shape of a received optical pulse 410, and a time associated with the peak of the curve may correspond to the peak-voltage time. As another example, a curve that is fit to the values of a pulse-detection output signal 145 may be used to determine a time associated with a temporal center of voltage signal 360 (e.g., the temporal center may be determined by calculating a centroid or weighted average of the curve).

A duration of a received pulse of light 410 may be determined from a duration or width of a corresponding voltage signal 360. For example, the difference between two time values of a pulse-detection output signal 145 may be used to determine a duration of a received pulse of light. In the example of FIG. 7, the duration of the pulse of light corresponding to voltage signal 360 may be determined from the difference ($t'_3 - t_3$), which may correspond to a received pulse of light with a pulse duration of 4 nanoseconds. As another example, a controller 150 may apply a curve-fit or interpolation operation to the values of the pulse-detection output signal 145, and the duration of the pulse of light may be determined based on a width of the curve (e.g., a full width at half maximum of the curve).

In particular embodiments, a temporal correction or offset may be applied to a determined time of emission or time of receipt to account for signal delay within a lidar system 100. For example, there may be a time delay of 2 ns between an electrical trigger signal that initiates emission of a pulse of light and a time when the emitted pulse of light exits the lidar system 100. To account for the 2-ns time delay, a 2-ns offset may be added to an initial time of emission determined by a receiver 140 or a processor of the lidar system 100. For example, a receiver 140 may receive an electrical trigger signal at time/TRIG indicating emission of a pulse of light by light source 110. To compensate for the 2-ns delay between the trigger signal and the pulse of light exiting the lidar system 100, the emission time of the pulse of light may be indicated as ($t_{TRIG}+2$ ns). Similarly, there may be a 1-ns time delay between a received pulse of light entering the lidar system 100 and a time when electrical edge signals corresponding to the received pulse of light are received by one or more TDCs 380 of a receiver 140. To account for the 1-ns time delay, a 1-ns offset may be subtracted from a determined time of receipt.

In particular embodiments, a processor or a receiver 140 may determine, based on a photocurrent signal i produced by a detector 340, a round-trip time T for a portion of an emitted optical signal to travel to a target 130 and back to a lidar system 100. Additionally, a processor or a receiver 140 may determine a distance D from the lidar system 100 to the target 130 based on the round-trip time T. For example, a detector 340 may produce a pulse of photocurrent i in response to a received pulse of light 410, and a receiver 140 may produce a voltage pulse (e.g., voltage signal 360) corresponding to the pulse of photocurrent. Based on the voltage signal 360, the receiver 140 or a processor may determine a time of receipt for the received pulse of light. Additionally, the receiver 140 or processor may determine a time of emission for a pulse of light (e.g., a time at which the pulse of light was emitted by a light source 110), where the received pulse of light 410 includes scattered light from the emitted pulse of light. For example, based on the time of receipt ($T_R$) and the time of emission ($T_E$), the receiver 140 or processor may determine the round-trip time T (e.g., $T=T_R-T_E$), and the distance D may be determined from the expression $D=c \cdot T/2$.

Figure 8:
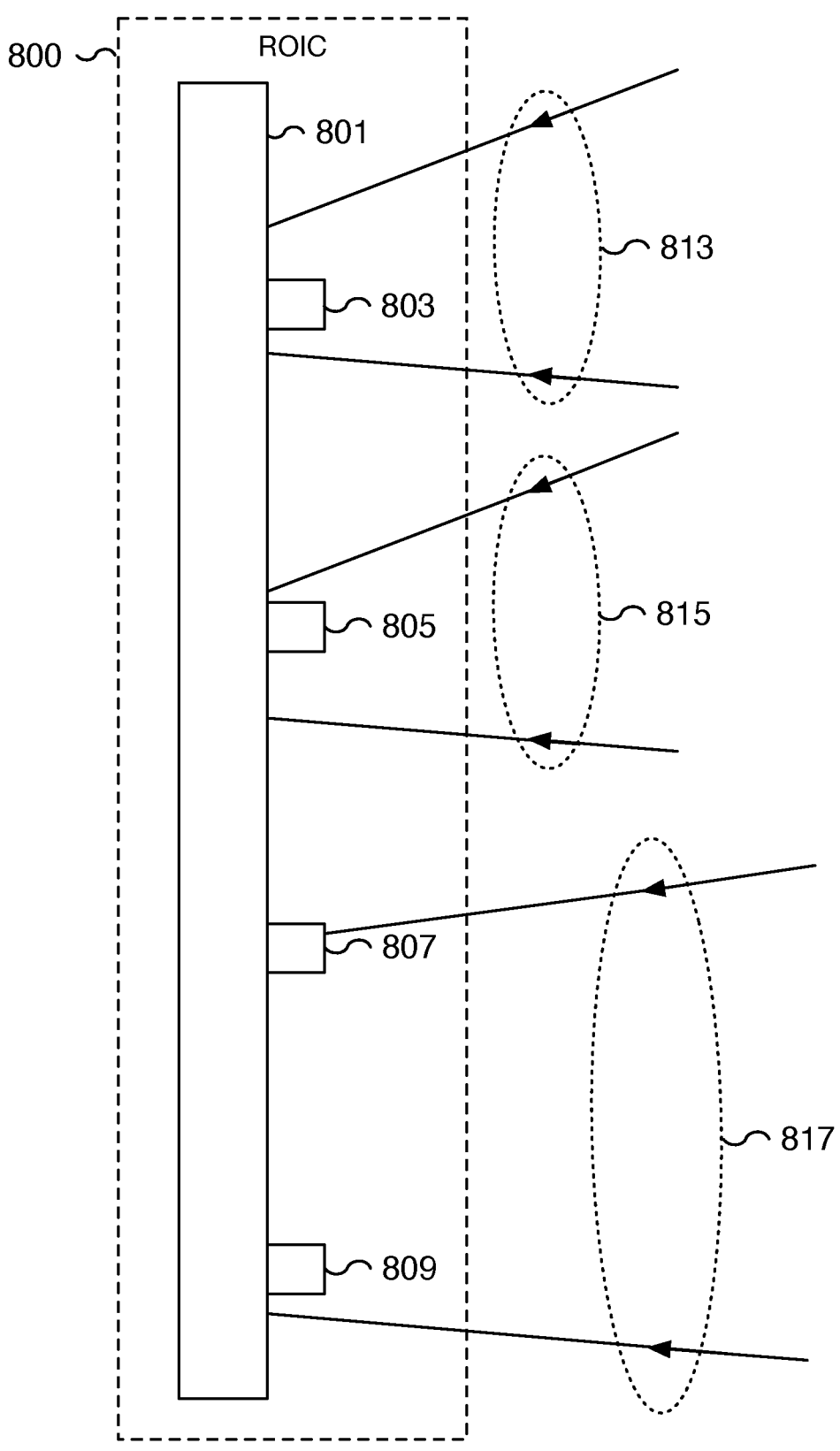
FIG. 8 illustrates an embodiment of a readout integrated circuit (ROIC) component of a lidar system configured with multiple detectors.

FIG. 8 illustrates an embodiment of a readout integrated circuit (ROIC) component of a lidar system configured with multiple detectors. In the example shown, readout integrated circuit (ROIC) 800 of a lidar system includes at least the main body component 801 of ROIC 800 and detector site locations 803, 805, 807, and 809. In the example shown, detector site locations 803, 805, 807, and 809 are detector site locations for detecting the reflection off downrange objects of beams emitted from the lidar system. Detector site location 803 is fully located within the beam pattern of focused input beam 813, detector site location 805 is fully located within the beam pattern of focused input beam 815, detector site location 807 is partially located within the beam pattern of focused input beam 817, and detector site location 809 is fully located within the beam pattern of focused input beam 817. Focused input beams 813, 815, and 817 correspond to at least a portion of the light scattered from one or more downrange targets and potentially the same downrange target. In some embodiments, focused input beams 813, 815, and 817 correspond to one or more different instances of output beam 125 of FIGS. 1-4 and/or may be received at their corresponding detector site locations 803, 805, 807, and/or 809 at different times. In some embodiments, the lidar system of FIG. 8 is lidar system 100 of FIGS. 1-4, ROIC 800 is a component of receiver 140 of FIGS. 1, 3, 6, and/or 7, and/or focused input beams 813, 815, and/or 817 correspond to instances of input beam 135 of FIGS. 1, 3, 4, 6 and/or 7. In some embodiments, each of detector site locations 803, 805, 807, and/or 809 corresponds to a different instance of detector 340 of FIGS. 3, 6, and/or 7.

In some embodiments, detector site locations 803, 805, 807, and 809 are positioned to each detect light pulses and to each detect potentially different portions of the same light pulse. For example, focused input beam 817 is detected by both detector site locations 807 (partially) and 809 (fully). In various embodiments, by utilizing multiple detector site locations, the accuracy of the lidar system is improved. For example, in the event focused input beam 817 is a strong signal, the detected light pulse at detector site location 807 may be a weak but usable signal whereas the detected light pulse at detector site location 809 may be too strong and result in a saturated and potentially unusable signal. In some embodiments, the different site locations can be further configured to process the detected input beams differently. For example, the amount of amplification applied to the received light pulse at each detector site location can be different. Moreover, in some embodiments, the detector site locations 803, 805, 807, and 809 are positioned to each detect light pulses associated with targets at different (and potentially overlapping) distances or ranges. For example, detector site location 803 can be positioned and configured to detect light pulses corresponding to near objects and detector site location 809 can be configured to detect light pulses corresponding to far objects. Although ROIC 800 is shown with four detector site locations (detector site locations 803, 805, 807, and 809), in various embodiments, a lidar system can include fewer or more detector site locations.

In some embodiments, main body component 801 of ROIC 800 is the main component of a readout integrated circuit. In some embodiments, ROIC 800 is an application-specific integrated circuit (ASIC) with multiple light detectors. For example, main body component 801 can be an ASIC designed for reading/processing signals from light detectors positioned at detector site locations 803, 805, 807, and 809. The actual light detectors can be coupled and/or mounted directly to the ASIC and may have an output that is electrically connected to the input of the ASIC. In various embodiments, ROIC 800, including main body component 801, captures sensor data from associated light detectors and can output corresponding output signals such as readout values that can be used to analyze the captured sensor data results. In some embodiments, ROIC 800 outputs one or more signals corresponding to one or more channels that can be analyzed by controller 150 and/or a processor such as processor 1410 of FIG. 14. In some embodiments, ROIC 800 performs functionality such as current-to-voltage conversion, voltage amplification, filtering, edge/level detection, timing, and/or time-to-digital conversion. In various embodiments, ROIC 800 may include one or more of the components of receiver 140 as shown in FIGS. 6 and 7.

Figure 9:
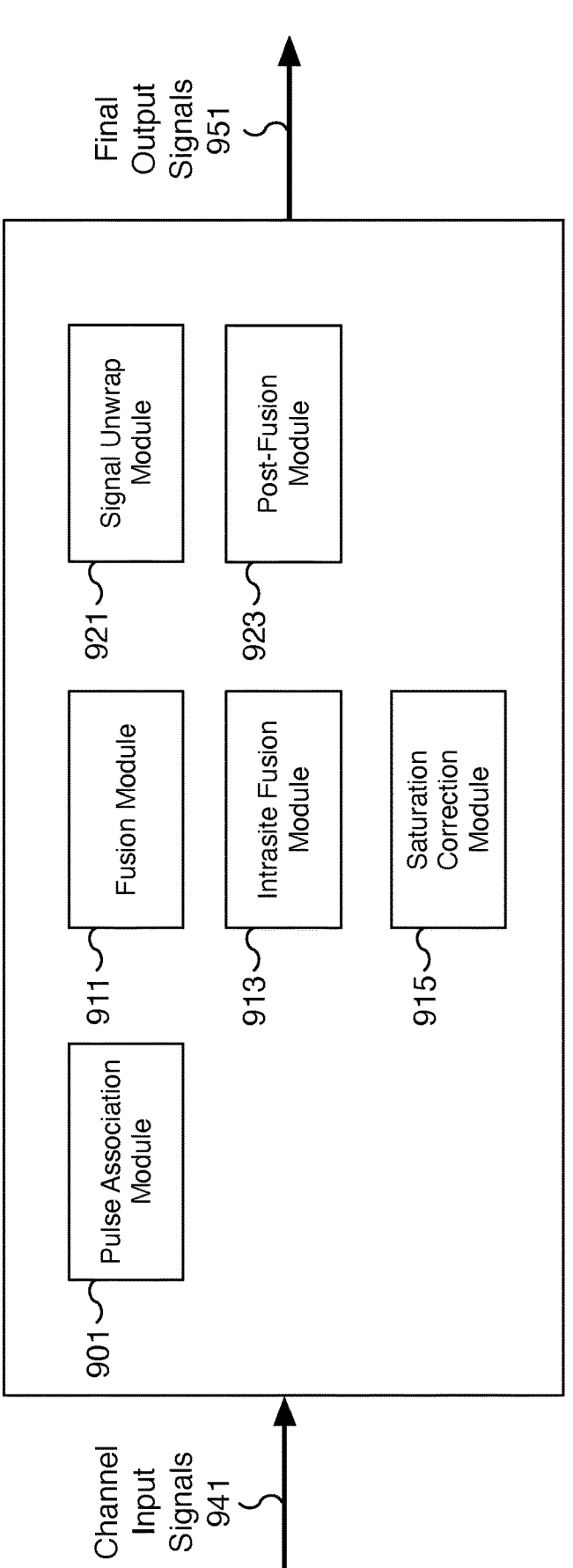
FIG. 9 illustrates components of an example controller for fusing multiple measurements from different channels.

FIG. 9 illustrates components of an example controller 150 for fusing multiple measurements from different channels. In the example shown, controller 150 is a controller unit of a lidar system and includes pulse association module 901, fusion module 911, intrasite fusion module 913, saturation correction module 915, signal unwrap module 921, and post-fusion module 923. Controller 150 receives as inputs channel input signals 941 and provides final output signals 951. In some embodiments, the lidar system of FIG. 9 is lidar system 100 of FIGS. 1-4 and controller 150 is controller 150 of FIG. 1. In some embodiments, channel input signals 941 correspond to output signals of a receiver such as receiver 140 of FIGS. 1, 3, 6, and/or 7. For example, channel input signals 941 can include output signal 145 of FIG. 1, output signals 145A-C of FIG. 6, and/or output signal 145 of FIG. 7. In some embodiments, final output signals 951 may be processed internally by controller 150, such as by a processor (not shown) of controller 150 and/or be provided to a downstream module for additional signal analysis. In various embodiments, final output signals 951 includes one or more fused measurement values of channel input signals 941 and can describe one or more features of an external target. For example, the measurement values of final output signals 951 can correspond to measurements associated with features such as a range, reflectance, shape, speed, surface angulation relative to the lidar system, and/or another feature of an external target of the lidar system. In various embodiments, controller 150 may include fewer components than shown and/or one or more of additional components not shown including a processor such as processor 1410 of FIG. 14.

In some embodiments, channel input signals 941 corresponds to received input signals from different channels provided to controller 150. The input signals can provide measurement values outputted by a lidar receiver and can correspond to measurement values from different channels associated with the same target and/or input pulse. Moreover, multiple signals of channel input signals 941 can be associated with the same detector site location, such as signals from different channels resulting from processing an input pulse received by the same detector but with different applied gains. In some embodiments, the received signals of channel input signals 941 can be a combination of usable and unusable signals. For example, one or more received signals of channel input signals 941 may be too weak or too saturated to be useful. In various embodiments, based on the configuration of controller 150, the signals of channel input signals 941 are provided to and/or processed by pulse association module 901.

In some embodiments, pulse association module 901 receives multiple signals from channel input signals 941 and determines which signals should be associated together. For example, multiple signals from different channels can be received by pulse association module 901 including signals corresponding to multiple different detector site locations and multiple signals from the same detector site location. The different received signals can be received as different channels. In various embodiments, pulse association module 901 analyzes the different received signals to group the measurements of the same pulse and target together by applying one or more pulse association techniques. For example, for measurement values related to a distance feature, a distance measurement can be computed from each signal and one or more threshold values are applied to determine whether the received signals are observing the same target. In the event the differences in distance measurements are within threshold values, the selective measurements can be determined to correspond to the same received input pulse. In various embodiments, the selective signals are then associated together. Other pulse association techniques are appropriate as well including those that utilize higher-dimensional features such as pulse morphology and prior information and/or knowledge.

In various embodiments, pulse association module 901 provides the grouped pulses to downstream components for additional processing including steps for channel fusion. For example, based on the configuration of controller 150, the associated pulses can be provided by pulse association module 901 for additional processing to fusion module 911, intrasite fusion module 913, and/or saturation correction module 915. For example, fusion module 911 can be configured to receive signals of channel input signals 941 corresponding to one or more different detector site locations and apply a fusion technique to create a fused output signal. In some embodiments, signals of channel input signals 941 that correspond to the same detector site location are first processed by intrasite fusion module 913. In some embodiments, the signals of channel input signals 941 may be first processed by saturation correction module 915 to analyze each signal for saturation properties and/or to attempt to correct a saturated signal.

In some embodiments, fusion module 911 is configured to receive multiple input signals and apply one or more fusion techniques to create a fused output signal. In some embodiments, the signals may be received directly from channel input signals 941, from intrasite fusion module 913, and/or from saturation correction module 915. For example, the received signals can correspond to one or more signal channels from one or more different detector site locations. Each received signal may be provided via a different channel. For example, the received signals can include signals corresponding to a very near detector site location with a medium gain applied, a near detector site location with a medium gain applied, the same near detector site location with a high gain applied, a far detector site location with a high gain applied, and a very far detector site location with a high gain applied. In various embodiments, fusion module 911 processes the different signals to produce a fused measurement. The produced fused measurement can have a dynamic range that is larger than that of any of the single input signals. In various embodiments, one or more different fusing techniques can be applied by fusion module 911 to fuse together the different associated channels. For example, different weights can be applied to each signal from the group of signals where the weight is the inverse of a corresponding measurement variance. Other techniques including machine learning techniques are appropriate as well. In various embodiments, the fused result of fusion module 911 can be provided to signal unwrap module 921 and/or post-fusion module 923.

In some embodiments, intrasite fusion module 913 is configured to receive multiple input signals associated with the same site detector (or cell) location. Based on the knowledge that the received signals correspond to the same detector site location and were received/detected by the same detector, intrasite fusion module 913 performs additional pre-processing on the channel signals prior to channel fusion. In some embodiments, intrasite processing includes intrasite channel fusion. For example, signals such as a medium gain signal and a high gain signal originating from the same detector site can be fused together. In some embodiments, intracell processing specific to a detector site location can be applied. For example, correction and/or adjustment factors can be applied to the different channel signals based on properties of the specific detector site location and/or knowledge of the target and/or input pulse. In some embodiments, the channel signals processed by intrasite fusion module 913 are provided to fusion module 911 and/or saturation correction module 915. For example, the analyzed and/or processed channel signals can be provided directly to fusion module 911 for use in fusing into a single measurement value or first to saturation correction module 915 to analyze the provided signals for saturation properties and/or to attempt to correct a saturated signal.

In some embodiments, saturation correction module 915 is configured to analyze received signals for saturation properties and/or to attempt to correct a saturated signal. For example, channel signals can be provided from different components such as directly from pulse association module 901 and/or intrasite fusion module 913. The received signals may be unusable due to saturation without additional processing. Using saturation correction module 915, a signal is processed to remove and/or adjust for saturation and the corrected signal may be used for channel fusion. In some embodiments, the saturation processing for a saturated channel signal utilizes information from signals for associated channels. In various embodiments, the analyzed and/or processed signals are provided to fusion module 911 and/or signal unwrap module 921 for additional processing.

In some embodiments, signal unwrap module 921 is configured to receive one or more signal values including a fused value from fusion module 911 and/or intrasite fusion module 913. Signal unwrap module 921 can apply additional unwrapping processing, if required and/or appropriate, to unwrap a signal including an unwrapped fused signal. For example, for some circular measurements, such as phase related measurements, an unwrapping step is applied by signal unwrap module 921 to resolve potential ambiguities. In some embodiments, range measurements are corrected in the event that range wrap occurs. In some embodiments, multiple input signals may be used by signal unwrap module 921, for example, as references, to unwrap a wrapped signal and/or to determine a signal needs unwrapping. Other unwrapping techniques are appropriate as well and can be applied by signal unwrap module 921. In various embodiments, signal unwrap module 921 provides an unwrapped and fused measurement value to post-fusion module 923.

In some embodiments, post-fusion module 923 is configured to receive a fused measurement for post-fusion processing to prepare a final fused measurement value. For example, a fused measurement can be received from signal unwrap module 921 and used to apply post-fusion processing to generate a final fused measurement value. In some embodiments, the post-fusion module 923 performs processing such as scaling, normalization, conversions, and/or other appropriate post-processing on a fused value. The provided post-fusion processing provides a final measurement value to final output signals 951. In some embodiments, the final measurement value is processed within controller 150 by one or more components that are not shown. In various embodiments, the final measurement value can correspond to a measurement value associated with a feature of an external target such as its range, reflectance, shape, speed, surface angulation relative to the lidar system, or another feature.

In some embodiments, final output signals 951 corresponds to output provided by post-fusion module 923. For example, final output signals 951 provides fused measurement values for downstream processing. In some embodiments, the fused measurement values correspond to measurement values associated with one or more features of an external target such as its range, reflectance, shape, speed, surface angulation relative to the lidar system, or another feature. For example, the provided final output signals 951 can be used to generate a point cloud or another representation of the targets external to the lidar system.

Figure 10:
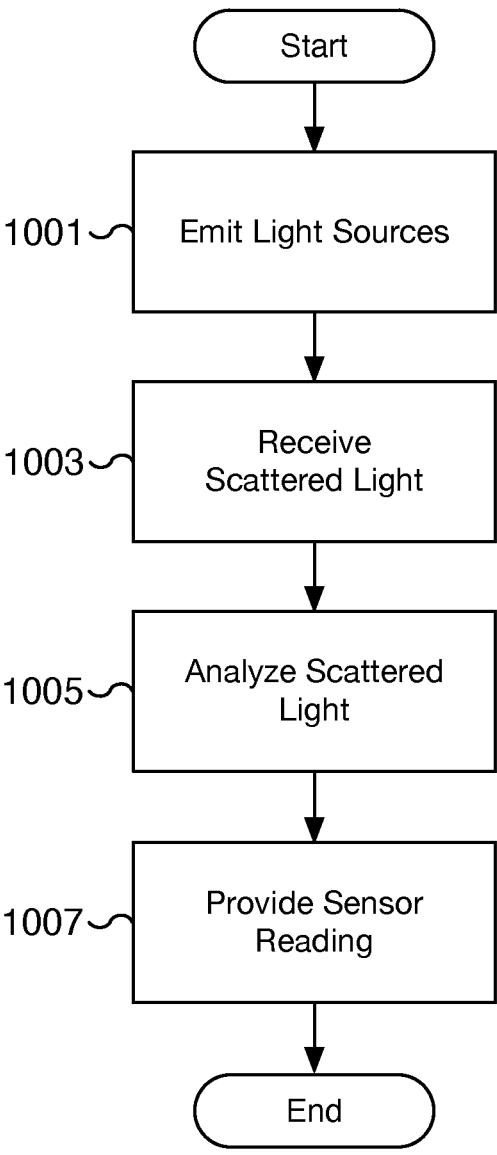
FIG. 10 is a flow chart illustrating an embodiment of a process of a lidar system for detecting objects.

FIG. 10 is a flow chart illustrating an embodiment of a process of a lidar system for detecting objects. Using the process of FIG. 10, a lidar system can detect objects such as objects downrange from the lidar system. For example, a vehicle equipped with the disclosed lidar system can detect other vehicles, pedestrians, lane markers, and street signs, etc. that are downrange from the vehicle. Depending on the orientation and number of lidar systems installed on the vehicle, different fields of regard can be scanned to determine the corresponding environment surrounding the vehicle. Vehicle safety features as well as autonomous driving features can be implemented using the captured environmental data. In various embodiments, the process of FIG. 10 can be performed by the disclosed lidar systems to detect downrange objects by emitting light pulses and detecting corresponding returned pulses. When an emitted light pulse hits an object, at least a portion of the scattered and/or reflected light can be captured by the lidar system as part of an input beam. In some embodiments, the reflected light is detected by one or more different detector site locations of a lidar receiver and the resulting signals are processed by a controller and/or processor of the lidar receiver. In some embodiments, the lidar system performing the process of FIG. 10 is lidar system 100 of FIGS. 1-4. In some embodiments, the lidar system utilizes a receiver such as receiver 140 of FIGS. 1, 3, 6, and/or 7 and a readout integrated circuit such as readout integrated circuit 800 of FIG. 8. In some embodiments, the lidar system utilizes a controller such as controller 150 of FIGS. 1 and/or 9.

At 1001, one or more light sources are emitted. For example, an output light beam is emitted from the lidar system. In some embodiments, the lidar system emits multiple output beams, each potentially offset and/or scanning a different field of regard. In some embodiments, the one or more of the different output beams are at different wavelengths and the different wavelength output beams can be separated in time by an encoding time delay. The encoding time delay used can be stored, for example, as a history of transmitted encoding time delays, and used to match received reflected light to the original transmitted source. In some embodiments, the output beam includes multiple wavelengths that have been multiplexed. In various embodiments, each output beam can reach downrange objects and can be scattered and/or reflected by the downrange object. In some embodiments, each light source can include a configurable laser capable of emitting light pulses of different wavelengths.

At 1003, scattered light is received. For example, light scattered and/or reflected by an object is received at the lidar sensor. The corresponding object can be a downrange object. In various embodiments, the received light has a particular wavelength and corresponds to one of the light sources emitted at 1001. For example, a lidar system emits light pulses of different wavelengths and receives scattered light associated with the different emitted pulses.

At 1005, the received scattered light is analyzed. For example, the received scattered light is directed to a receiver component of the lidar system where sensor data can be captured and analyzed. In some embodiments, the receiver component includes a receive lens for focusing the received scattered light onto a readout integrated circuit (ROIC) of the receiver where one or more detector site locations of the detector plane are located. The detector site locations can be used to detect scatter patterns associated with the received scattered light and the different detector site locations can be offset at least in part to minimize crosstalk between light corresponding to differently aimed output beams. In some embodiments, the received scattered light includes multiple wavelengths that are then split into their different corresponding received pulses by wavelength. In various embodiments, each detector site location can output a signal corresponding to a detected pulse using one or more channels. For example, multiple channels can be associated with a single detector site location where each channel is configured to provide a signal that corresponds to a detected input pulse with a different applied gain.

Using detectors positioned at the detector site locations, sensor data can be captured and analyzed for sensor readings. In some embodiments, the analysis is performed at least in part by the readout integrated circuit (ROIC) and/or processor of the receiver and/or a controller of the lidar system. The processing can include determining an output signal corresponding to the detected scatter pattern and fusing multiple different measurement values into a single measurement value. In some embodiments, each output signal is a sensor reading that corresponds to a measurement of the detected scattered light, such as an intensity reading or another measured sensor reading. In some embodiments, the received scattered light is associated into groups of received light pulses and the timing between different light pulses in a group is measured. Based on the measured timing, different light pulses are differentiated from one another and used to identify a corresponding transmit pulse to match a received pulse.

At 1007, a sensor reading is provided. For example, one or more sensor readings, such as one or more fused measurement values, are provided in response to the analysis of the received scattered light performed at 1005. The sensor reading can be an intensity reading and/or another measurement or measurements. In some embodiments, the sensor reading includes location and/or distance data. For example, sensor readings can correspond to a point cloud based on objects detected in the fields of regard scanned by the lidar system.

Figure 11:
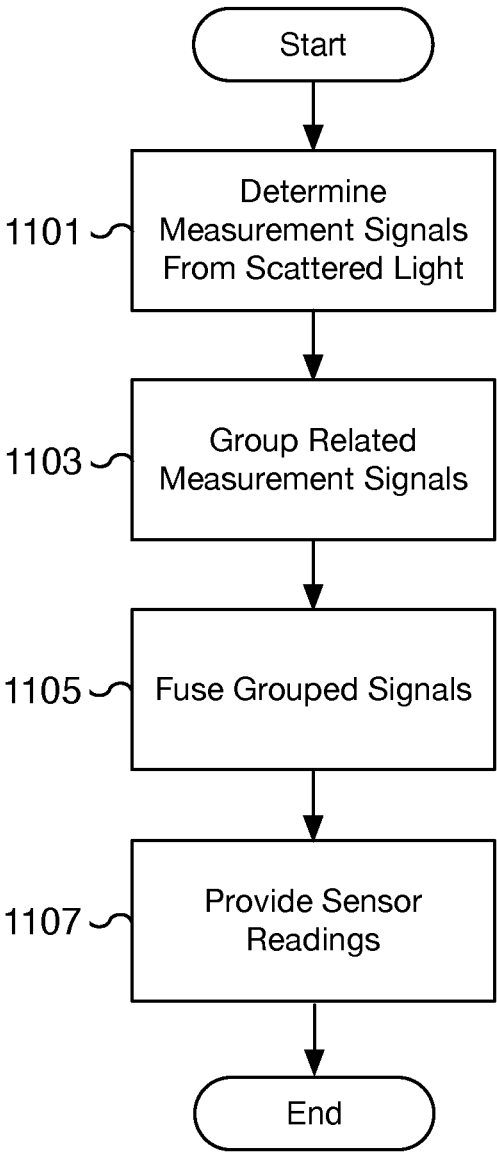
FIG. 11 is a flow chart illustrating an embodiment of a process of a lidar system for analyzing returned light.

FIG. 11 is a flow chart illustrating an embodiment of a process of a lidar system for analyzing returned light. Using the process of FIG. 11, a lidar system and in particular one or more receivers and/or controllers can analyze returned light to detect objects such as objects downrange from the lidar system. In various embodiments, the process of FIG. 11 can be performed by the disclosed lidar systems to detect and fuse measurement values related to features of downrange objects. For example, different measurement values can be fused together to produce a single fused measurement value with improved accuracy and dynamic range. In some embodiments, the process of FIG. 11 is performed at 1003 and/or 1005 of FIG. 10. In some embodiments, the lidar system performing the process of FIG. 11 is lidar system 100 of FIGS. 1-4. In some embodiments, the lidar system utilizes a receiver such as receiver 140 of FIGS. 1, 3, 6, and/or 7, a readout integrated circuit such as readout integrated circuit 800 of FIG. 8, and/or a controller such as controller 150 of FIGS. 1 and/or 9.

At 1101, measurement signals are determined from scattered light. For example, when an emitted light pulse hits an object, at least a portion of the scattered and/or reflected light is captured by the lidar system as part of an input beam. In some embodiments, the reflected light is detected by one or more different detector site locations of a lidar receiver and analyzed to produce one or more measurement signals. For example, a signal detector site location can produce one or more measurement signals including different measurement signals corresponding to different applied gain configurations. Similarly, multiple detector site locations can produce different measurement signals corresponding to the same input pulse. In some embodiments, the different produced measurement signals are each provided via a different channel. In various embodiments, the analysis to determine light pulses is performed at least in part by the readout integrated circuit (ROIC) and/or processor of the receiver and/or a controller of the lidar system. In some embodiments, signal processing techniques are applied at 1101, for example, to improve the accuracy of the measurement value and/or to convert the received signal to a more applicable format. For example, a range walk correction step can be performed to correct a range value for intensity-based errors and/or an S-curve inversion step can be applied to linearize the pulse area and convert the value to a normalized energy value. Other channel-wise processing steps can be performed as well.

At 1103, related measurement signals are grouped. For example, measurement signals corresponding to the same input pulse and target are associated together. In some embodiments, the input pulses that are grouped together correspond to a single incident pulse of light. The grouping can be performed based on determined probability values where the associations made are probabilistic and based on an estimate of each channel's measurement uncertainty at its current operating point. In some embodiments, the related measurement signals are grouped based on one or more threshold values that determine when different values are close enough to be associated. Other techniques for grouping are appropriate as well, such as applying a cost function to determine optimal groupings.

At 1105, the grouped measurement signals are fused. For example, the measurement signals grouped together at 1103 are fused together to produce a single measurement value. For example, the measurement values associated with each grouped channel for each incident pulse is fused into a single measurement value, such as a single range or intensity value. In some embodiments, the fusion technique is based on determined probability values. For example, the determined fused measurement value can be driven by an uncertainty estimate of each associated measurement value. In some embodiments, additional steps may be performed to correct measurements such as those that are in saturation.

At 1107, sensor readings are provided. For example, the fused measurement values determined at 1105 are provided as sensor readings. In some embodiments, the sensor readings correspond to different measurement values associated with one or more features of external targets, such as values associated with distance, reflectance, shape, speed, surface angulation relative to the lidar system, etc. In some embodiments, a sensor reading can include location and/or distance data. For example, sensor readings can correspond to or be used to generate a point cloud based on objects detected in the fields of regard scanned by the lidar system.

Figure 12:
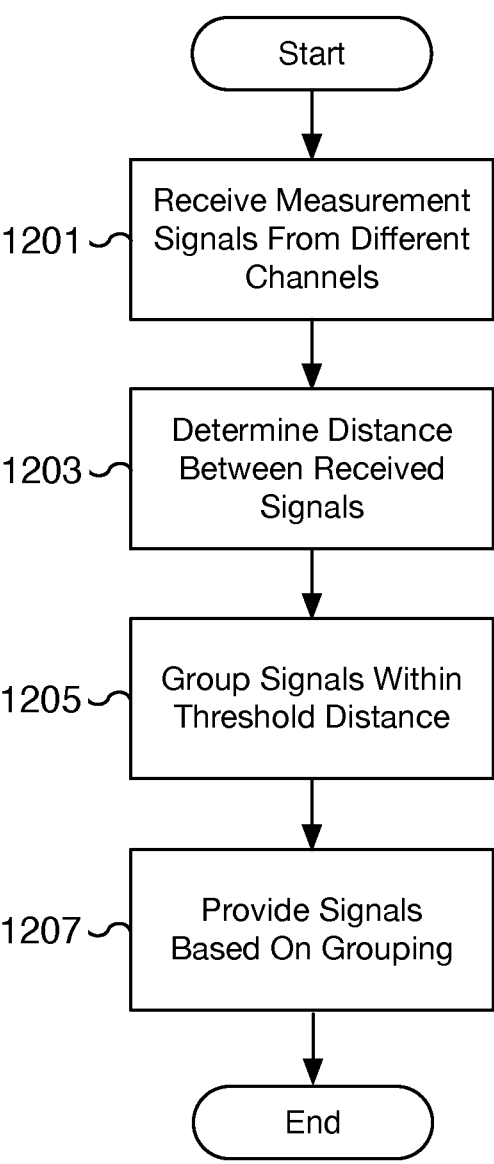
FIG. 12 is a flow chart illustrating an embodiment of a process of a lidar system for grouping related signals from different channels that correspond to the same target.

FIG. 12 is a flow chart illustrating an embodiment of a process of a lidar system for grouping related signals from different channels that correspond to the same target. Using the process of FIG. 12, a lidar system and in particular one or more receivers and/or controllers can analyze different returned light pulses to group light pulses that correspond to the same incident pulse or external target. Measurements of the same pulse from the same as well as from different detector site locations of a receiver can be grouped together. In various embodiments, the measurements are grouped together to produce a fused result. In some embodiments, the process of FIG. 12 is performed at 1003 and/or 1005 of FIG. 10 and/or at 1103 of FIG. 11. In some embodiments, the lidar system performing the process of FIG. 12 is lidar system 100 of FIGS. 1-4. In some embodiments, the lidar system utilizes a receiver such as receiver 140 of FIGS. 1, 3, 6, and/or 7, a readout integrated circuit such as readout integrated circuit 800 of FIG. 8, and/or a controller such as controller 150 of FIGS. 1 and/or 9.

At 1201, measurement signals from different channels are received. For example, the outputs corresponding to one or more different detector site locations are received. Each output can be received as its own channel. The output signals for each channel may have additional processing performed on them, such as an intensity-dependent range correction (sometimes also known as a "range walk" correction) step and/or an S-curve inversion step. In various embodiments, the different signals received correspond to measurement values associated with one or more features of a potential external target.

At 1203, the distance between received signals is determined. For example, distance measurements can be computed between the different received signals. In some embodiments, the distance measurements can utilize higher-dimensional features. For example, reflectance, or aspects of pulse morphology, such as reflectance, rising edge slopes, or another property associated with the different signals can be used to determine the distance (or difference) between signals. In some embodiments, the distance measurements can utilize prior information, such as knowledge that a pulse with a particular energy and range on one channel would likely result in a measurement with a certain energy and range on another channel. In various embodiments, the measurements can be performed on signals that are received both simultaneously in time as well as signals corresponding to the same target over a span of time. In some embodiments, the distance measurements are difference measurements. For example, a distance measurement can be the difference between two detected input pulse shapes.

At 1205, signals within a threshold distance are grouped. For example, signals with distances determined at 1203 within one or more configured or calculated threshold distances are grouped together. As one example, in the scenario where the measurements are return pulses for two channels from the same send pulse, the distance measurements from step 1203 may be the difference in the ranges observed. In the event the difference in ranges is small enough (e.g., within a configured threshold value), the measurements are grouped together and can be later evaluated as corresponding to the same received echo.

In some embodiments, alternative search strategies are applied to the distance measurements determined at 1203. For example, a global method can be applied where every measurement value is compared to all the others. The number of values for comparison can be reduced by applying a threshold window to the received values. For example, only values received within a threshold window are compared to one another. Other approaches may be appropriate as well and can result in improved search efficiency, for example, by applying problem-specific knowledge. For example, in some applications, a single incident pulse results in at most a single measurement on each channel. In this scenario, the number of distance measurements that are computed can be significantly reduced by eliminating intra-channel comparisons. In particular embodiments, the grouping is performed by applying deep learning techniques. For example, the threshold values can be determined using machine learning techniques and/or the grouping can be determined by applying a trained machine learning model. In some embodiments, the grouping is determined by applying a cost function, such as a cost function that sums all the distances between signals and/or measurement values in a grouping to identify a grouping with the minimum cost.

At 1207, the signals are provided based on grouping. For example, signals that are grouped together at 1205 are provided with their group affiliation. In some embodiments, the signals are assigned a group and a corresponding group identifier is provided with each applicable signal. Signals with the same group identifier can be evaluated as corresponding to the same received input pulse and/or target. In various embodiments, the signal grouping information is utilized to fuse grouped signals and their measurement values into a single output signal and measurement value.

Figure 13:
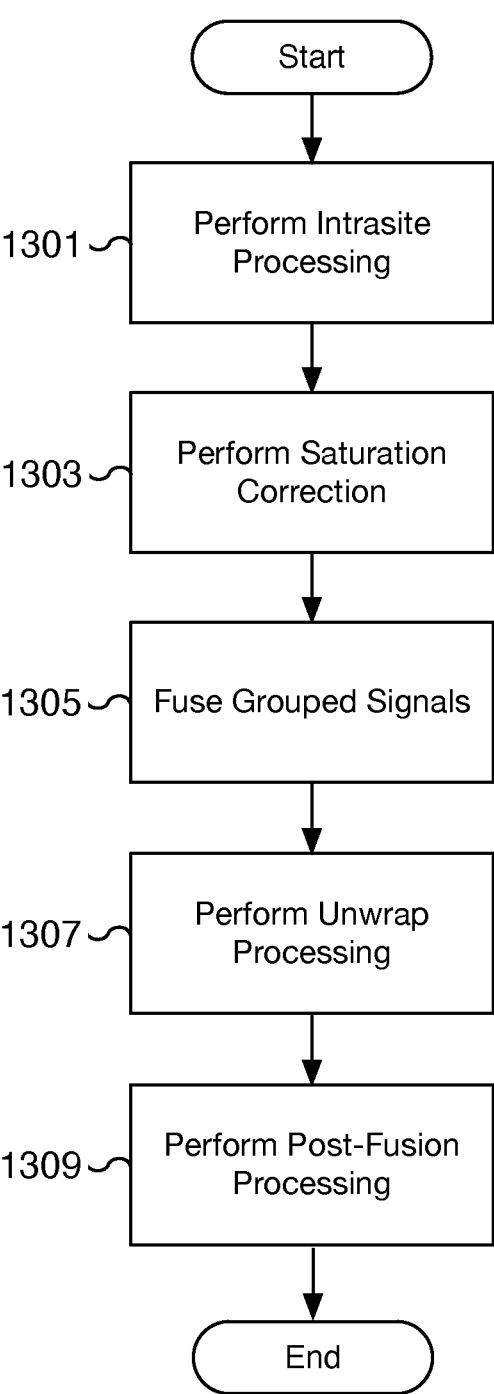
FIG. 13 is a flow chart illustrating an embodiment of a process of a lidar system for fusing grouped signals from different channels into a single measurement value.

FIG. 13 is a flow chart illustrating an embodiment of a process of a lidar system for fusing grouped signals from different channels into a single measurement value. Using the process of FIG. 13, a lidar system and in particular one or more receivers and/or controllers can analyze grouped signals and determine a fused output signal. By fusing measurements corresponding to the same pulse and/or target together, a fused output signal with improved accuracy and/or dynamic range is provided. The provided final fused measurement value can correspond to a measurement value associated with a feature of an external target, such as range, reflectance, or shape measurement, among others. In some embodiments, the process of FIG. 13 is performed at 1003 and/or 1005 of FIG. 10 and/or at 1105 of FIG. 11. In some embodiments, the lidar system performing the process of FIG. 13 is lidar system 100 of FIGS. 1-4. In some embodiments, the lidar system utilizes a receiver such as receiver 140 of FIGS. 1, 3, 6, and/or 7, a readout integrated circuit such as readout integrated circuit 800 of FIG. 8, and/or a controller such as controller 150 of FIGS. 1 and/or 9. In some embodiments, one or more steps of FIG. 13 are performed in another order based on the configuration and/or measurement values of interest. For example, in some embodiments, measurement values corresponding to different features may involve performing the saturation correction step of 1303 prior to the intrasite processing step of 1301 and/or the unwrap processing step of 1307 prior to a fusing step of 1305.

At 1301, intrasite processing is performed. For example, processing for signals that are grouped together and originate from the same detector site (or cell) location are performed at 1301. In some embodiments, intrasite processing includes intrasite channel fusion. For example, grouped signals such as a medium gain signal and a high gain signal originating from the same detector site can be fused together at 1301. In various embodiments, intrasite channels can be first fused together at 1301 before processing signals (including fused signals) and/or channels from different detector site locations at 1305. In some embodiments, one or more additional intrasite processing steps are performed at 1301, such as channel correction steps based on other signals received from the same detector site location. For example, correction and/or adjustment factors can be applied to the different channel signals from the same site location based on properties of the specific detector site location and/or knowledge of the target and/or input pulse.

At 1303, saturation correction is performed. For example, received signals are analyzed and for measurement values that exhibit saturation, the saturated signals can be corrected. Once adjusted for saturation, the corrected signal can be provided for downstream processing including channel fusion. In some embodiments, the saturation correction performed at 1303 includes evaluating signals for saturation. For example, in the event a signal is not found to be in a saturated state, no saturation correction processing on the signal is performed and the signal can be provided for downstream processing in an unmodified state. In the event the signal is identified as being in saturation, the signal may be excluded from additional downstream processing or, if applicable, corrected for saturation, for example, to improve its accuracy. In some embodiments, the saturation correction processing for a signal from a saturated channel utilizes information from signals for associated channels. For example, values from other channels can be utilized and/or incorporated to adjust and/or correct for saturation. In some embodiments, saturation correction may be performed prior to the intrasite processing step of 1301.

At 1305, grouped signals are fused. For example, multiple grouped signals including potentially a fused intrasite signal and/or saturation corrected signals are fused to produce a single fused signal. The signals that are fused together can correspond to different signals provided via different channels with different applied gains that all correspond to the same input pulse and/or target. For example, the grouped signals can include signals corresponding to a very near detector site location with a medium gain applied, a near detector site location with a medium gain applied, the same near detector site location with a high gain applied, a far detector site location with a high gain applied, and a very far detector site location with a high gain applied.

In some embodiments, the signals are grouped by a pulse association module, such as pulse association module 901 of FIG. 9, and are fused to produce a single fused measurement. The produced fused measurement can have a dynamic range that is larger than that of any of the single input signals from the group. In various embodiments, one or more different fusing techniques can be applied to fuse together the different associated channels. For example, different weights can be determined and applied to each signal from the group of signals. In some embodiments, each signal's weight is based on an inverse of the signal's estimated variance value. Other techniques including machine learning techniques are appropriate as well. For example, a machine learning model using the different signals of the group as input features can be applied to predict a fused measurement value.

In some embodiments, the fusing of the grouped signals requires converting the different signals, such as to a different format and/or into a different output space. For example, signals with different modulation patterns can be fused together but may require first converting one or more of the different signals so that they are compatible with one another. As another example, as part of the fusing process, the grouped signals may be converted to a different space, such as converting range values to a velocity measurement value.

At 1307, unwrap processing is performed. For example, an unwrap processing step can be applied in the event the fused signal determined at 1305 requires unwrapping. For example, for some circular measurements, such as phase related measurements, an unwrapping step is applied at 1307 to resolve potential ambiguities. In some embodiments, range measurements are corrected in the event that range wrap occurs. In some embodiments, multiple input signals may be used, for example, as references, to unwrap a wrapped signal and/or to determine that a signal needs unwrapping. Other unwrapping techniques are appropriate as well and can be applied at 1307. In some embodiments, the unwrap processing step of 1307 is applied prior to the fusing step of 1305.

At 1309, post-fusion processing is performed. For example, a fused and potentially unwrapped measurement is received and post-fusion processing is applied to prepare a final fused measurement value. In some embodiments, the post-fusion processing includes performing processing such as scaling, normalization, conversions, and/or other appropriate post-processing on the received fused value. For example, the final fused measurement value can correspond to a value in a different space than the received intermediate fused measurement value, such as by applying a motion model to estimate a velocity of the external target based on a received intermediate fused range measurement value determined over a known period of time. In various embodiments, the post-fusion processing provides the final measurement value for downstream processing. The provided final measurement value can correspond to a fused measurement value associated with a feature of an external target such as its range, reflectance, shape, speed, surface angulation relative to the lidar system, or another feature.

Figure 14:
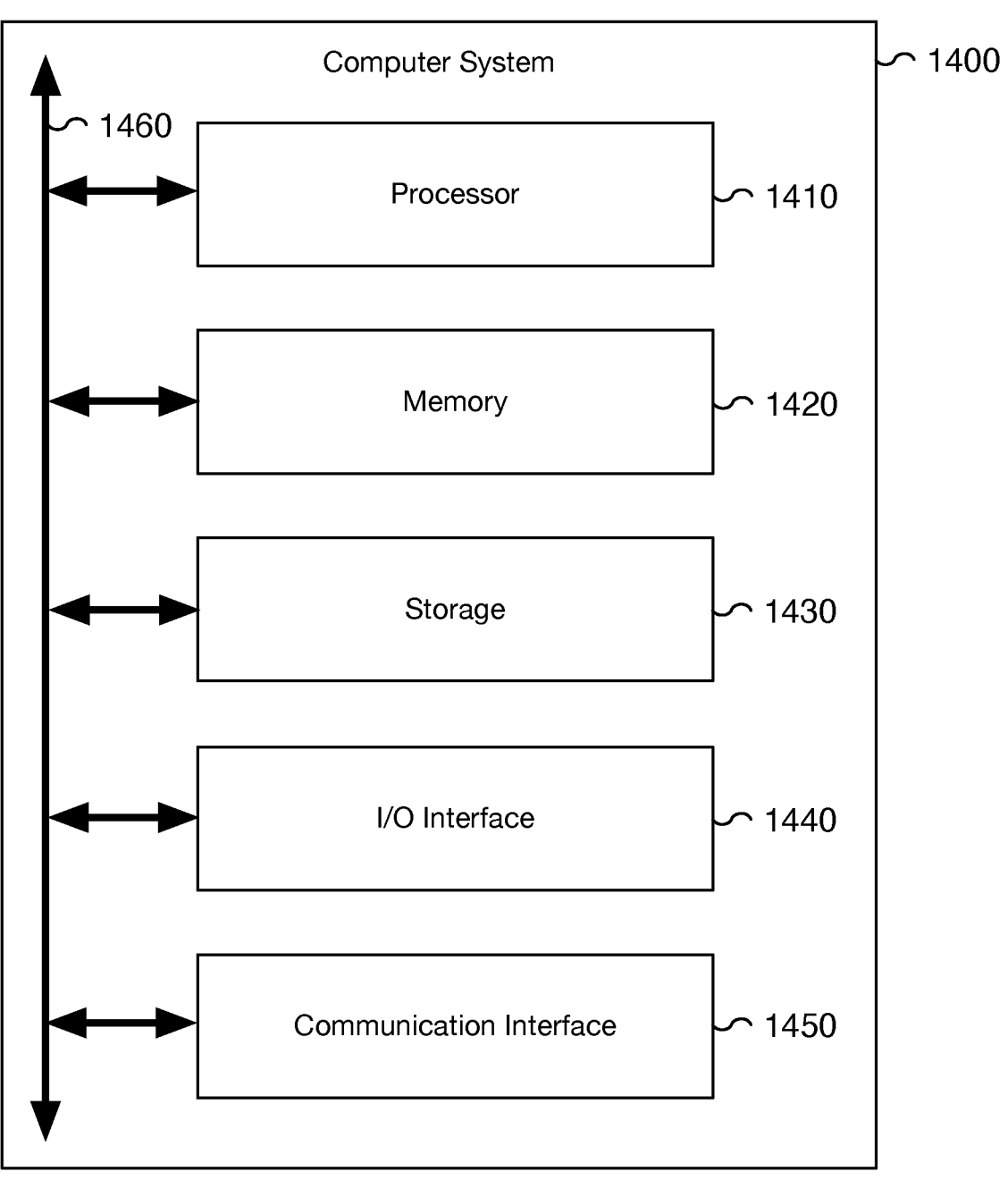
FIG. 14 illustrates an example computer system.

FIG. 14 illustrates an example computer system 1400. In particular embodiments, one or more computer systems 1400 may perform one or more steps of one or more methods described or illustrated herein. In particular embodiments, one or more computer systems 1400 may provide functionality described or illustrated herein. In particular embodiments, software running on one or more computer systems 1400 may perform one or more steps of one or more methods described or illustrated herein or may provide functionality described or illustrated herein. Particular embodiments may include one or more portions of one or more computer systems 1400. In particular embodiments, a computer system may be referred to as a processor, a controller, a computing device, a computing system, a computer, a general-purpose computer, or a data-processing apparatus. Herein, reference to a computer system may encompass one or more computer systems, where appropriate. In some embodiments, computer system 1400 is used to perform one or more of the processes of FIGS. 10-13.

Computer system 1400 may take any suitable physical form. As an example, computer system 1400 may be an embedded computer system, a system-on-chip (SOC), a single-board computer system (SBC), a desktop computer system, a laptop or notebook computer system, a mainframe, a mesh of computer systems, a server, a tablet computer system, or any suitable combination of two or more of these. As another example, all or part of computer system 1400 may be combined with, coupled to, or integrated into a variety of devices, including, but not limited to, a camera, camcorder, personal digital assistant (PDA), mobile telephone, smartphone, electronic reading device (e.g., an e-reader), game console, smart watch, clock, calculator, television monitor, flat-panel display, computer monitor, vehicle display (e.g., odometer display or dashboard display), vehicle navigation system, lidar system, ADAS, autonomous vehicle, autonomous-vehicle driving system, cockpit control, camera view display (e.g., display of a rear-view camera in a vehicle), eyewear, or head-mounted display. Where appropriate, computer system 1400 may include one or more computer systems 1400; be unitary or distributed; span multiple locations; span multiple machines; span multiple data centers; or reside in a cloud, which may include one or more cloud components in one or more networks. Where appropriate, one or more computer systems 1400 may perform without substantial spatial or temporal limitation one or more steps of one or more methods described or illustrated herein. As an example, one or more computer systems 1400 may perform in real time or in batch mode one or more steps of one or more methods described or illustrated herein. One or more computer systems 1400 may perform at different times or at different locations one or more steps of one or more methods described or illustrated herein, where appropriate.

As illustrated in the example of FIG. 14, computer system 1400 may include a processor 1410, memory 1420, storage 1430, an input/output (I/O) interface 1440, a communication interface 1450, or a bus 1460. Computer system 1400 may include any suitable number of any suitable components in any suitable arrangement.

In particular embodiments, processor 1410 may include hardware for executing instructions, such as those making up a computer program. As an example, to execute instructions, processor 1410 may retrieve (or fetch) the instructions from an internal register, an internal cache, memory 1420, or storage 1430; decode and execute them; and then write one or more results to an internal register, an internal cache, memory 1420, or storage 1430. In particular embodiments, processor 1410 may include one or more internal caches for data, instructions, or addresses. Processor 1410 may include any suitable number of any suitable internal caches, where appropriate. As an example, processor 1410 may include one or more instruction caches, one or more data caches, or one or more translation lookaside buffers (TLBs). Instructions in the instruction caches may be copies of instructions in memory 1420 or storage 1430, and the instruction caches may speed up retrieval of those instructions by processor 1410. Data in the data caches may be copies of data in memory 1420 or storage 1430 for instructions executing at processor 1410 to operate on; the results of previous instructions executed at processor 1410 for access by subsequent instructions executing at processor 1410 or for writing to memory 1420 or storage 1430; or other suitable data. The data caches may speed up read or write operations by processor 1410. The TLBs may speed up virtual-address translation for processor 1410. In particular embodiments, processor 1410 may include one or more internal registers for data, instructions, or addresses. Processor 1410 may include any suitable number of any suitable internal registers, where appropriate. Where appropriate, processor 1410 may include one or more arithmetic logic units (ALUs); may be a multi-core processor; or may include one or more processors 1410.

In particular embodiments, memory 1420 may include main memory for storing instructions for processor 1410 to execute or data for processor 1410 to operate on. As an example, computer system 1400 may load instructions from storage 1430 or another source (such as, for example, another computer system 1400) to memory 1420. Processor 1410 may then load the instructions from memory 1420 to an internal register or internal cache. To execute the instructions, processor 1410 may retrieve the instructions from the internal register or internal cache and decode them. During or after execution of the instructions, processor 1410 may write one or more results (which may be intermediate or final results) to the internal register or internal cache. Processor 1410 may then write one or more of those results to memory 1420. One or more memory buses (which may each include an address bus and a data bus) may couple processor 1410 to memory 1420. Bus 1460 may include one or more memory buses. In particular embodiments, one or more memory management units (MMUs) may reside between processor 1410 and memory 1420 and facilitate accesses to memory 1420 requested by processor 1410. In particular embodiments, memory 1420 may include random access memory (RAM). This RAM may be volatile memory, where appropriate. Where appropriate, this RAM may be dynamic RAM (DRAM) or static RAM (SRAM). Memory 1420 may include one or more memories 1420, where appropriate.

In particular embodiments, storage 1430 may include mass storage for data or instructions. As an example, storage 1430 may include a hard disk drive (HDD), a floppy disk drive, flash memory, an optical disc, a magneto-optical disc, magnetic tape, or a Universal Serial Bus (USB) drive or a combination of two or more of these. Storage 1430 may include removable or non-removable (or fixed) media, where appropriate. Storage 1430 may be internal or external to computer system 1400, where appropriate. In particular embodiments, storage 1430 may be non-volatile, solid-state memory. In particular embodiments, storage 1430 may include read-only memory (ROM). Where appropriate, this ROM may be mask ROM (MROM), programmable ROM (PROM), erasable PROM (EPROM), electrically erasable PROM (EEPROM), flash memory, or a combination of two or more of these. Storage 1430 may include one or more storage control units facilitating communication between processor 1410 and storage 1430, where appropriate. Where appropriate, storage 1430 may include one or more storages 1430.

In particular embodiments, I/O interface 1440 may include hardware, software, or both, providing one or more interfaces for communication between computer system 1400 and one or more I/O devices. Computer system 1400 may include one or more of these I/O devices, where appropriate. One or more of these I/O devices may enable communication between a person and computer system 1400. As an example, an I/O device may include a keyboard, keypad, microphone, monitor, mouse, printer, scanner, speaker, camera, stylus, tablet, touch screen, trackball, another suitable I/O device, or any suitable combination of two or more of these. An I/O device may include one or more sensors. Where appropriate, I/O interface 1440 may include one or more device or software drivers enabling processor 1410 to drive one or more of these I/O devices. I/O interface 1440 may include one or more I/O interfaces 1440, where appropriate.

In particular embodiments, communication interface 1450 may include hardware, software, or both providing one or more interfaces for communication (such as, for example, packet-based communication) between computer system 1400 and one or more other computer systems 1400 or one or more networks. As an example, communication interface 1450 may include a network interface controller (NIC) or network adapter for communicating with an Ethernet or other wire-based network or a wireless NIC (WNIC); a wireless adapter for communicating with a wireless network, such as a WI-FI network; or an optical transmitter (e.g., a laser or a light-emitting diode) or an optical receiver (e.g., a photodetector) for communicating using fiber-optic communication or free-space optical communication. Computer system 1400 may communicate with an ad hoc network, a personal area network (PAN), an in-vehicle network (IVN), a local area network (LAN), a wide area network (WAN), a metropolitan area network (MAN), or one or more portions of the Internet or a combination of two or more of these. One or more portions of one or more of these networks may be wired or wireless. As an example, computer system 1400 may communicate with a wireless PAN (WPAN) (such as, for example, a BLUETOOTH WPAN), a WI-FI network, a Worldwide Interoperability for Microwave Access (WiMAX) network, a cellular telephone network (such as, for example, a Global System for Mobile Communications (GSM) network), or other suitable wireless network or a combination of two or more of these. As another example, computer system 1400 may communicate using fiber-optic communication based on 100 Gigabit Ethernet (100 GbE), 10 Gigabit Ethernet (10 GbE), or Synchronous Optical Networking (SONET). Computer system 1400 may include any suitable communication interface 1450 for any of these networks, where appropriate. Communication interface 1450 may include one or more communication interfaces 1450, where appropriate.

In particular embodiments, bus 1460 may include hardware, software, or both coupling components of computer system 1400 to each other. As an example, bus 1460 may include an Accelerated Graphics Port (AGP) or other graphics bus, a controller area network (CAN) bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these. Bus 1460 may include one or more buses 1460, where appropriate.

In particular embodiments, various modules, circuits, systems, methods, or algorithm steps described in connection with the implementations disclosed herein may be implemented as electronic hardware, computer software, or any suitable combination of hardware and software. In particular embodiments, computer software (which may be referred to as software, computer-executable code, computer code, a computer program, computer instructions, or instructions) may be used to perform various functions described or illustrated herein, and computer software may be configured to be executed by or to control the operation of computer system 1400. As an example, computer software may include instructions configured to be executed by processor 1410. In particular embodiments, owing to the interchangeability of hardware and software, the various illustrative logical blocks, modules, circuits, or algorithm steps have been described generally in terms of functionality. Whether such functionality is implemented in hardware, software, or a combination of hardware and software may depend upon the particular application or design constraints imposed on the overall system.

In particular embodiments, a computing device may be used to implement various modules, circuits, systems, methods, or algorithm steps disclosed herein. As an example, all or part of a module, circuit, system, method, or algorithm disclosed herein may be implemented or performed by a general-purpose single- or multi-chip processor, a digital signal processor (DSP), an ASIC, a FPGA, any other suitable programmable-logic device, discrete gate or transistor logic, discrete hardware components, or any suitable combination thereof. A general-purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In particular embodiments, one or more implementations of the subject matter described herein may be implemented as one or more computer programs (e.g., one or more modules of computer-program instructions encoded or stored on a computer-readable non-transitory storage medium). As an example, the steps of a method or algorithm disclosed herein may be implemented in a processor-executable software module which may reside on a computer-readable non-transitory storage medium. In particular embodiments, a computer-readable non-transitory storage medium may include any suitable storage medium that may be used to store or transfer computer software and that may be accessed by a computer system. Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs (e.g., compact discs (CDs), CD-ROM, digital versatile discs (DVDs), blu-ray discs, or laser discs), optical disc drives (ODDs), magneto-optical discs, magneto-optical drives, floppy diskettes, floppy disk drives (FDDs), magnetic tapes, flash memories, solid-state drives (SSDs), RAM, RAM-drives, ROM, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In particular embodiments, certain features described herein in the context of separate implementations may also be combined and implemented in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variations of a sub-combination.

While operations may be depicted in the drawings as occurring in a particular order, this should not be understood as requiring that such operations be performed in the particular order shown or in sequential order, or that all operations be performed. Further, the drawings may schematically depict one more example processes or methods in the form of a flow diagram or a sequence diagram. However, other operations that are not depicted may be incorporated in the example processes or methods that are schematically illustrated. For example, one or more additional operations may be performed before, after, simultaneously with, or between any of the illustrated operations. Moreover, one or more operations depicted in a diagram may be repeated, where appropriate. Additionally, operations depicted in a diagram may be performed in any suitable order. Furthermore, although particular components, devices, or systems are described herein as carrying out particular operations, any suitable combination of any suitable components, devices, or systems may be used to carry out any suitable operation or combination of operations. In certain circumstances, multitasking or parallel processing operations may be performed. Moreover, the separation of various system components in the implementations described herein should not be understood as requiring such separation in all implementations, and it should be understood that the described program components and systems may be integrated together in a single software product or packaged into multiple software products.

Various embodiments have been described in connection with the accompanying drawings. However, it should be understood that the figures may not necessarily be drawn to scale. As an example, distances or angles depicted in the figures are illustrative and may not necessarily bear an exact relationship to actual dimensions or layouts of the devices illustrated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B or C" means at least one of the following: A; B; C; A and B; A and C; B and C; A, B and C. An exception to this definition will occur if a combination of elements, devices, steps, or operations is in some way inherently mutually exclusive.

As used herein, words of approximation such as, without limitation, "approximately, "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by ±0.5%, ±1%, ±2%, ±3%, ±4%, ±5%, ±10%, ±12%, or ±15%. The term "substantially constant" refers to a value that varies by less than a particular amount over any suitable time interval. For example, a value that is substantially constant may vary by less than or equal to 20%, 10%, 1%, 0.5%, or 0.1% over a time interval of approximately $10^4$ s, $10^3$ s, $10^2$ s, 10 s, 1 s, 100 ms, 10 ms, 1 ms, 100 µs, 10 µs, or 1 µs. The term "substantially constant" may be applied to any suitable value, such as for example, an optical power, a pulse repetition frequency, an electrical current, a wavelength, an optical or electrical frequency, or an optical or electrical phase.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that B is a factor that affects the determination of A. In some instances, other factors may also contribute to the determination of A. In other instances, A may be determined based solely on B.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a light source configured to generate an emitted pulse of light;
   a receiver configured to detect at least a portion of the emitted pulse of light scattered by an external target and provide a plurality of different measurement signals for the detected emitted pulse of light, wherein the plurality of different measurement signals includes a super-low gain measurement signal, a low gain measurement signal, a medium gain measurement signal, and a high gain measurement signal, and wherein the receiver includes a detector site location and a plurality of gain channels coupled to the detector site location, the plurality of gain channels including a superlow gain channel, a low gain channel, a medium gain channel, and a high gain channel to produce the superlow gain measurement signal, the low gain measurement signal, the medium gain measurement signal, and the high gain measurement signal, respectively; and
   a processor configured to analyze the plurality of different measurement signals to identify the plurality of different measurement signals as corresponding to the same external target, determine that a first measurement signal provided by the high gain channel is saturated, determine a saturation-corrected measurement signal using a second measurement signal provided by the superlow gain channel, and combine the identified plurality of different measurement signals including the saturation-corrected measurement signal to determine a measurement for the external target.

2. The system of claim 1, wherein identifying the plurality of different measurement signals as corresponding to the same external target includes determining one or more distance values between the plurality of different measurement signals.

3. The system of claim 2, wherein identifying the plurality of different measurement signals as corresponding to the same external target further includes comparing the determined one or more distance values with one or more threshold values.

4. The system of claim 2, wherein identifying the plurality of different measurement signals as corresponding to the same external target further includes applying a cost function using the determined one or more distance values.

5. The system of claim 2, wherein determining the one or more distance values includes analyzing a property associated with the plurality of different measurement signals.

6. The system of claim 5, wherein the property associated with the plurality of different measurement signals includes a reflectance value.

7. The system of claim 1, wherein combining the identified plurality of different measurement signals to determine the measurement for the external target includes determining a corresponding weight to apply to each corresponding measurement signal of the identified plurality of different measurement signals.

8. The system of claim 7, wherein the determined corresponding weight is based on an inverse of a corresponding estimated variance value determined for the corresponding measurement signal of the identified plurality of different measurement signals.

9. The system of claim 1, wherein combining the identified plurality of different measurement signals to determine the measurement for the external target includes applying a machine learning model using the identified plurality of different measurement signals as input features to predict the measurement for the external target.

10. The system of claim 1, wherein the receiver includes a second detector site location positioned such that a return pulse corresponding to the emitted pulse of light is detected by the detector site location and the second detector site location with different overlap between the return pulse and the detector site location than between the return pulse and the second detector site location.

11. The system of claim 10, wherein the processor is configured to fuse a first subset of the plurality of different measurement signals corresponding to the detector site location, the first subset including at least a medium gain measurement signal provided by the medium gain channel and a high gain measurement signal provided by the high gain channel, to determine an intrasite fused signal.

12. The system of claim 11, wherein the processor is configured to unwrap a wrapped range measurement value determined from combining the identified plurality of different measurement signals.

13. The system of claim 12, wherein the processor is configured to perform post-fusion processing on a fused measurement value determined by combining the identified plurality of different measurement signals, the post-fusion processing including scaling, normalization, or conversions, or combinations thereof.

14. The system of claim 1, wherein the determined measurement for the external target is a range or reflectance value.

15. The system of claim 1, wherein the determined measurement for the external target is a shape, a velocity, or a surface angulation value.

16. A method, comprising:
   emitting light from a light source;
   scanning the emitted light across a field of view;
   using a first detector to detect a return light pulse corresponding to the emitted light scattered by a target located downrange and providing a first measurement signal;
   using a second detector to detect the return light pulse and provide a second measurement signal;
   using a receiver that includes a detector site location and a plurality of gain channels coupled to the detector site location, the plurality of pain channels including a superlow gain channel, a low pain channel, a medium gain channel, and a high gain channel, to generate a plurality of different measurement signals for the return light pulse;
   identifying the first measurement signal and the second measurement signal as corresponding to the same target; and
   combining the first measurement signal and the second measurement signal to determine a fused measurement for the target, including determining that a measurement signal provided by the high gain channel is saturated, determining a saturation-corrected measurement signal using a measurement signal provided by the superlow gain channel, and combining including the saturation-corrected measurement signal.

17. The method of claim 16, wherein identifying the first measurement signal and the second measurement signal as corresponding to the same target includes determining one or more distance values between the first measurement signal and the second measurement signal and comparing the determined one or more distance values with one or more threshold values.

18. The method of claim 16, wherein identifying the first measurement signal and the second measurement signal as corresponding to the same target includes determining one or more distance values between the first measurement signal and the second measurement signal and applying a cost function using the determined one or more distance values.

19. The method of claim 16, wherein combining the first measurement signal and the second measurement signal to determine the fused measurement for the target includes determining a first weight to apply to the first measurement signal and a second weight to apply to the second measurement signal.

20. A system, comprising:

a light source configured to emit light;

a scanner configured to scan the emitted light across a field of view;

a first detector of a receiver configured to detect a return light pulse corresponding to the emitted light scattered by an external target located downrange to provide a first measurement signal;

a second detector of the receiver configured to detect the return light pulse to provide a second measurement signal and a third measurement signal, wherein the second measurement signal and the third measurement signal are different; and a processor configured to identify the first measurement signal, the second measurement signal, and the third measurement signal as corresponding to the same external target, determine that the third measurement signal provided by a high gain channel of a plurality of gain channels coupled to a detector site location is saturated, determine a saturation-corrected measurement signal using the first measurement signal provided by a superlow gain channel of the plurality of gain channels, and combine the first measurement signal, the second measurement signal, and the third measurement signal including the saturation-corrected measurement signal to determine a fused measurement for the external target.

* * * * *